United States Patent
Stacey

[11] 3,931,563
[45] Jan. 6, 1976

[54] FORCE COMMUTATION STATIC FREQUENCY CHANGER APPARATUS USING DIRECT CURRENT CHOPPER TECHNIQUE

[75] Inventor: Eric J. Stacey, Pittsburgh, Pa.

[73] Assignee: Westinghouse Electric Corporation, Pittsburgh, Pa.

[22] Filed: Sept. 25, 1974

[21] Appl. No.: 509,168

[52] U.S. Cl. .................. 321/7; 321/45 C; 321/61
[51] Int. Cl.² ........................................... H02M 5/45
[58] Field of Search .......... 321/7, 45 C, 61, 65, 69

[56] References Cited
UNITED STATES PATENTS

| | | |
|---|---|---|
| 3,431,483 | 3/1969 | Lafuze .................................. 321/7 |
| 3,470,447 | 9/1969 | Gyugyi et al. ......................... 321/7 |
| 3,493,838 | 2/1970 | Gyugyi et al. ......................... 321/7 |
| 3,742,336 | 6/1973 | Bedford ................................. 321/7 |
| 3,763,418 | 10/1973 | Beck et al. ......................... 321/45 C |
| 3,775,662 | 11/1973 | Compoly et al. ................... 321/45 C |

*Primary Examiner*—Gerald Goldberg
*Attorney, Agent, or Firm*—C. M. Lorin

[57] ABSTRACT

An improved force commutated cycloconverter is provided by selectively switching a DC chopper to different groups of main thyristors including a thyristor to be commutated in the controlled sequence of thyristor commutations. The DC chopper is self-commutating. The forced commutating circuit is applied to various configurations of cycloconverters.

28 Claims, 30 Drawing Figures

A.C. INPUT 3,931,563

FORCE COMMUTATION STATIC FREQUENCY CHANGER APPARATUS USING DIRECT CURRENT CHOPPER TECHNIQUE

CROSS REFERENCE TO RELATED APPLICATIONS

The present application is related to the following concurrently filed patent application which is assigned to the same assignee as the present application:

Ser. No. 509,185, which was filed on Sept. 25, 1974 by Eric J. Stacey.

BACKGROUND OF THE INVENTION

It has long been realized that the force commutated cycloconverter is best suited for suppplying variable frequency AC power to control the speed of AC machines. That it can be advantageously used for other applications in view of its unique properties, has also been established.

A cycloconverter is comprised of a multiplicity of electronic "switches" (e.g., transistors, thyristors) used to fabricate an AC output voltage waveform from a multiphase input source. This is accomplished by sequentially switching segments of the input voltage waves to the output, so that the desired output waveform is produced. The operating principle of a cycloconverter is well-known in the art and is described in a book entitled "Thyristor Phase-Controlled Converters And Cycloconverters" by B. R. Pelly, published in 1971 by John Wiley and Sons. For the force commutated cycloconverter the output waveform is fabricated in such a manner that the "switches" have the ability to interrupt the flow of current at any time independently of the instantaneous input source voltages and of the load current.

In practice, the switches may be realized either by devices having intrinsic turn-off ability (i.e., transistors or gate controlled switches), or SCR devices often called thyristors with the additional force commutating circuitry which is necessary to terminate the conduction of this latter type of switches. Unfortunately, adequately rated "turn-off" devices which are workable in high power systems are not presently available, therefore the second type of switches, e.g. thyristors, must generally be used.

In the last decade considerable effort has been expended to devise techniques for force commutating thyristors in cycloconverters. However, most of the circuits developed to date have serious shortcomings, and are suitable only for rather limited applications. In view of the great potential advantage of the forced commutated cycloconverter, it is desirable to improve on the present commutating circuits, especially for the commutation of the "Unrestricted Frequency Changer" (U.F.C.) with three-phase output, since this system has been shown to be most practical and economical in industrial applications. (For a broad definition of the Unrestricted Frequency Changer see in "Electronics Engineers' Handbook," First Edition, 1975, McGraw-Hill Co., Section 15-42, page 15-52 under "Power Frequency Changers" by L. Gyugyi. A typical unrestricted frequency changer has been described in U.S. Pat. No. 3,170,107 of R. D. Jessee.).

There are basically three approaches to force commutation of the main thyristors of a cycloconverter:

1. Individual switch commutation (i.e., commutating each conducting switch separately),
2. Input line commutation (i.e., commutating all switches at the input lines),
3. Load commutation (i.e., commutating all switches at the load).

These approaches have relative advantages and disadvantages.

1. INDIVIDUAL SWITCH COMMUTATION

Individual switch commutation provides for separate commutation of each switching element in the cycloconverter. Separate commutation of individual switches may be accomplished by two basic arrangements. The first arrangement (as shown in FIG. 1 described hereinafter), consists in using for each switch two thyristors connected in antiparallel in the power path and in providing a commutating circuit in parallel thereto. The second arrangement (as shown in FIG. 2 described hereinafter) consists in having the power thyristor to be commutated mounted in the central branch of a rectifier bridge connected in the power path, and providing a commutating circuit in parallel thereto. A force commutated cycloconverter which is typical of a first mode of individual switch commutation applied to cycloconverters is disclosed in U.S. Pat. No. 3,302,093 of C. J. Yarrow issued Jan. 31, 1967. This circuit combines natural and forced commutation depending on the voltage direction between the thyristor to be turned off. Forced commutation is achieved in the Yarrow patent by adding only passive components to the basic cycloconverter. The operation is automatic, forced commutation occurring at each required instant as a result of firing the next pair of anitiparallel thyristors in sequence. This is an advantage. However, the voltage charging the commutating capacitors is determined by the difference between two instantaneous input voltages at he moment of firing. This difference may be small when the load current is large. Consequently, the commutating capability of the Yarrow circuit varies over the output cycle and it depends upon the load. This requires restricting the operation conditions in order to be able to maintain commutating ability. In a second known form of individual force commutation (as illustrated in FIG. 4 described hereinafter) firing pulses are applied to thyristors of a positive bank of thyristors when the load is positive, to the thyristors of a negative bank of thyristors when the load is negative, when the conditions are right so that natural commutation occurs; otherwise, force commutation is effected with commutating capacitors which are charged to some voltage prior to the instant of commutation. In contrast to the first form of individual force commutation the capacitors here do not follow the instantaneous voltage difference between phases but keep their maximum voltage. Therefore, the commutation capability of the second form of individual force commutation just mentioned is superior to the one of the Yarrow circuit previously mentioned. However, much higher ratings are required for the thyristors. Also, the commutating ability is still dependent upon operating conditions of the cycloconverter, which for this reason must be restricted accordingly.

A third form of individual force commutation applied to cycloconverters has been described by L. J. Ward and W. Sinclair in a paper entitled "Production of Constant Frequency Electrical Power for Aircraft Using Static Equipment," presented in 1962 at a joint conference in England of the Royal Aeronautical Society and the Institution of Electrical Engineers. (This circuit is illustrated in FIG. 5 hereinafter described). In such case, the main switching thyristors of the cycloconverter must always be force commutated. A capacitor is charged during conduction of one thyristor, discharged when the other is fired to turn off the first one and charged to a reverse polarity to turn off the second one. When the first thyristor is again fired, the capacitor is discharged and brought back to the original charge and polarity, ready for the next force commutation. With this arrangement the number of main cycloconverter thyristors and commutating capacitors is halved by comparison to the previous form of individual commutation. However, this circuit is also load sensitive. There is also the inconvenience of reversing the voltage of the commutating capacitor for the next commutation, since it entails two operations of the discharge circuit for one conduction interval. This increases the losses and the rating of the thyristor.

More generally, the above-mentioned three circuits of the prior art have in common the disadvantage that their commutation capability is load dependent. Therefore, for a reliable operation under all conditions, additional components are required.

2. INPUT LINE COMMUTATION

With this type of commutation of a commutating circuit is connected, as illustrated in FIGS. 6 and 7 described hereinafter between the phase lines of the power source, for a cycloconverter in a Bridge or Wye configuration. To commutate, it is necessary that the commutation circuit decrease the input line voltage to the thyristor to be turned off below the line voltage to the thyrsitor to be fired.

At each commutation instant the voltage of the input line feeding the conducting "outgoing" thyristor must be forced to drop below that of the line feeding the "oncoming" thyristor. If one considers a three phase cycloconverter it is clear that each output phase should be treated as a separate single-phase unit and that the inputs to each unit be isolated from the others to prevent undesirable interaction of the commutation circuits. In general, such operation is not desired. Input line commutation requires that either separate commutating circuits be provided for each input line, or that several common commutating circuits be used and connected appropriately to each input line by "steering" thyristors.

3. Load Commutation

One typical known mode of load commutation with cycloconverters provides full commutating capability under all operating conditions. A single commutating circuit achieves commutation of all main thyristors for one phase, thus giving a good utilization of commutating components.

It appears from the preceding enumeration of the three basic arrangements for a forced commutation cycloconverter that in both individual and input line commutation, the commutation pulse is applied at a separate point for each main thyristor. This requires many individual commutating circuits. Also for a reliable operation, independent from load current and instantaneous voltage levels, each individual commutating circuit would have to include many components, the total number of which would be excessive.

With load commutation however, the commutation pulse is applied at a point common to a number of main thyristors, and the number of separate commutation circuits required is therefore reduced. With the number of commutating circuits and thyristors reduced the basic control can also be simpler. The present invention makes generally use of this third approach to commutation, and therefore affords the advantages derived therefrom. However, this particular approach does not exclude the use of the input line commutation approach whenever the cycloconverter is used in a condition of reverse flow of power for a particular application, for instance in an aircraft electrical plant which can be used both in flight with the engine as the source of power and on the ground with a local source of power for the purpose of starting the engine, the alternator coupled to the engine being the load in the later instance.

One object of the present invention is to provide an unrestricted static frequency changer system of improved capability through the use of forced commutation.

Another object of the present invention is to provide an improved force commutated cycloconverter of the type using load commutation.

Still another object of the present invention is to provide a cycloconverter of the forced commutation type using a DC chopper commutation circuit in conjunction with the switches of the cycloconverter.

A further object of the present invention is to apply a DC chopper commutation circuit to selected types of cycloconverters for forced commutation thereof.

One object of the invention is to provide forced commutation in cycloconverters which is independent from load conditions.

An additional object of the present invention is to provide a cycloconverter of the forced commutation type which is free from the usual restrictions of operation for commutating capability.

SUMMARY OF THE INVENTION

The invention provides for a novel and unique type of force commutated AC to AC state frequency changer apparatus specially suited for the unrestricted frequency changer type of operation. Self-commutating DC chopper means is associated with all the cyclically and temporarily controlled switches of a group within the frequency changer, that they be naturally commutated or not. Single phase and three phase configurations are considered specifically with a view of the best utilization of the force commutation circuit and of its use in common with several groups of main switches in the apparatus.

BRIEF DESCRIPTION OF THE DRAWINGS

FIGS. 8 and 9 are typical of load commutation, FIG. 8 for a Wye configuration while FIG. 9 is typical of load commutation for the bridge configuration;

REVIEW OF FORCED COMMUTATION SYSTEM FOR CYCLOCONVERTERS OF THE PRIOR ART

A₁ Individual Switch Commutation

Figure 1:
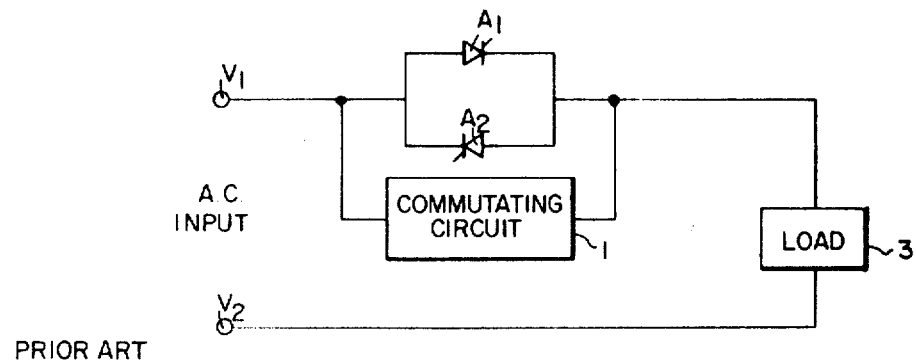
FIGS. 1 and 2 represent two basic arrangements of the prior art for individual switch commutation.
Figure 2:
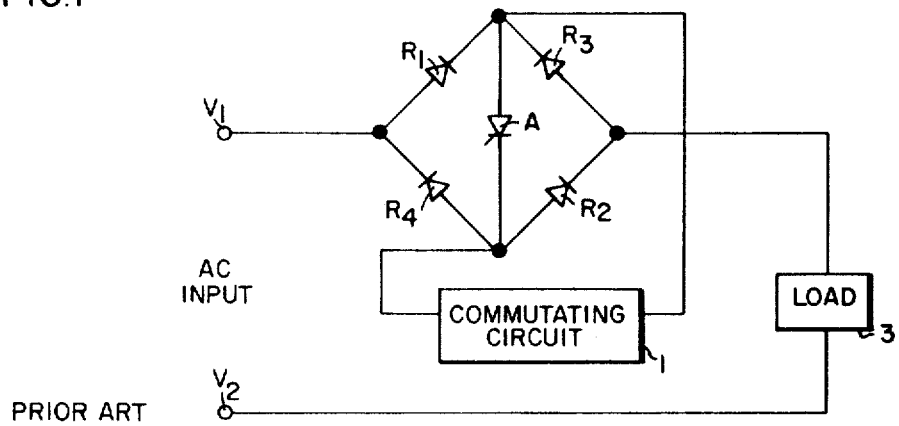

FIGS. 1 and 2 show two basic arrangements for Individual Switch Commutation. In FIG. 1, a commutating circuit 1 is connected in parallel to two thyristors A1, A2 mounted in antiparallel in the power path between the power source, $V_1$, $V_2$ and a load 3. FIG. 2 shows a commutating circuit 1 associated with a thyristor A connected in the central branch of a rectifier bridge comprising rectifiers $R_1$ to $R_4$ and mounted in the power path between the power source $V_1$, $V_2$ and a load 3.

Figure 3:
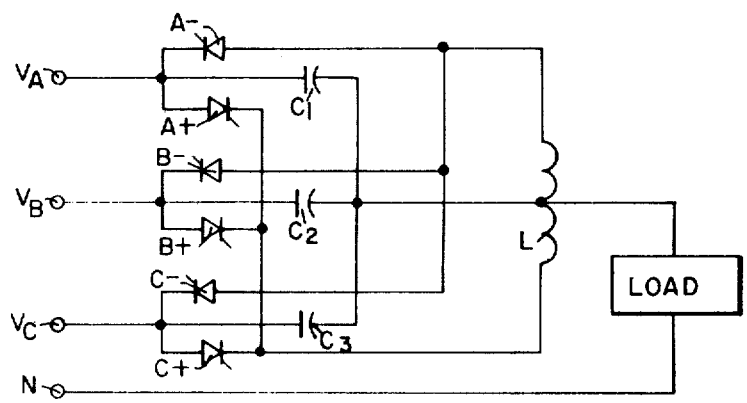
FIGS. 3, 4 and 5 represent three prior art circuits illustrative of individual switch commutation of a cycloconverter.

FIG. 3 illustrates the forced commutation circuit which is typical of the above-mentioned Yarrow arrangement. The thyristors are gated on in pairs and continuous drive is provided. It is seen that under appropriate conditions the circuit commutates "naturally." For Example, assume thyristor A+ is ON and the phase voltages are such that $V_B > V_A > 0$. Then upon firing the second thyristor pair (B+, B−), thyristor A+ will turn off and thyristor B+ will take over conduction naturally. When the conditions for natural commutation are not met, for instance assuming A+ is ON and the phase voltages are such that $V_A > V_B > 0$, firing the second thyristor pair (B+, B−) a short circuit between phases A and B would establish via thyristors A+ and B+. However, at this time capacitor C2 is charged to $V_{C2}$ (right hand plate positive) while C1 has no charge ($V_{C1} = 0$). As thyristor B− turns ON, voltage $V_{C2}$ is impressed on the upper winding of inductor L. The induced voltage in the lower winding of the inductor appears across thyristor A+ with a polarity to turn it off. Since positive current was initially assumed (A+ was conducting) after the commutation transient (when the resonant current becomes equal to the load current) thyristor B+ will take over the conduction.

Forced commutation is achieved here by adding only passive components to the basic cycloconverter. Operation is automatic, forced commutation occurring at each required instant as a result of firing the next thyristor in sequence. However, since the voltage on the commutating capacitors is determined by the instantaneous difference between two appropriate input voltages, at the moment of firing, this difference may be small when the load current is large. Consequently, the commutating capability of the circuit varies over the output cycle and is dependent on the load. Therefore the operating conditions must be restricted so that sufficient commutating ability is always retained.

Figure 4:
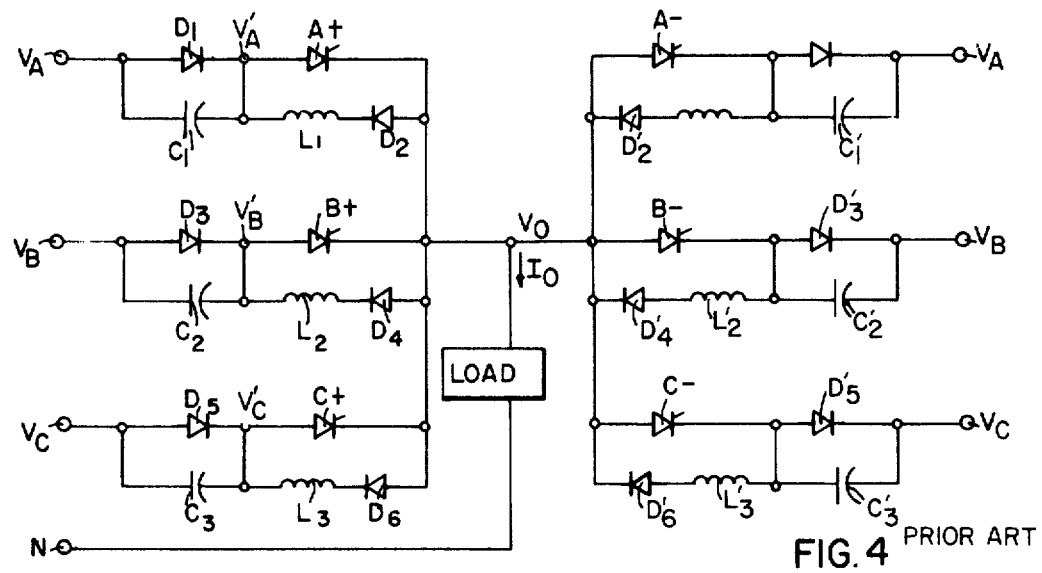

FIG. 4 depicts a forced commutation circuit of the above-mentioned second mode of individual switch commutation where one load is energized from a positive and a negative bank underphases $V_A$, $V_B$, $V_C$ of the power supplies, with a neutral line N. Firing pulses are applied to the thyristors of the "positive bank" when the load current is positive; the thyristors of the negative bank are fired when the load current is negative. When conditions are right the circuit operates with "natural commutation," for instance, assuming thyristor A+ is ON, and with a current $I_o > 0$, the phase relation is $V_B > V_A > 0$. Then, firing thyristor B+ will effectively turn off thyristor A+.

Forced commutation is based upon the principle that the commutating capacitors are charged to some (maximum) voltage prior to the instant of commutation. The capacitors, in contrast to the preceding circuit do not follow the instantaneous voltage difference between phases but keep their "maximum" voltage.

Assuming now that while thyristor A+ is ON the phases have the relation $V_A > V_B > 0$. It is obvious that if capacitor C2 were to hold no charge (or without C2), thyristor B+ could not be rendered conductive. However, during the conduction intervals of thyristor C+ and thyristor A+, $V_0$ the potential at the junction of the banks to the load has been more positive than $V_B$ and thus capacitor C2 has been charged through diode D4 and inductor L2 to a potential of 2 ($V_0 - V_B$). The charge thus acquired on C2 is preserved when $V_B$ becomes greater than $V_0$, because the discharge path is blocked by D3. B+ is fired ($V_A > V_B$), the sum $V_B + V_{C2} = V_B{'}$ must be greater than $V_A$ to insure commutation. This condition is assumed to be generally satisfied.

The commutation capability of this circuit is greater than the preceding arrangement because of the preserved maximum charge of the commutating capacitor. However, considerably higher voltage ratings are required for the thyristors employed in this circuit. Also, the commutation ability here is still dependent on operating conditions which must be suitably restricted.

Figure 5:
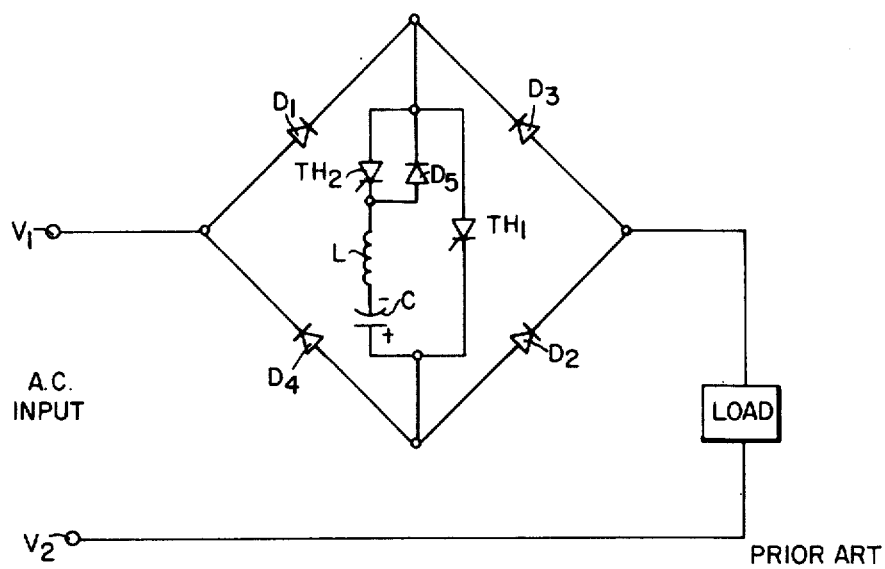

FIG. 5 shows the third above-mentioned known arrangement of individual switch commutation.

In this arrangement the main switching thyristors of the cycloconverter must always be force commutated. The operation of this circuit can be understood by assuming that thyristor TH1 is conducting and capacitor C is charged as indicated (top plate negative). When thyristor TH2 is fired, capacitor C starts to discharge via thyristor TH2, inductor L and thyristor TH1. Thyristor TH1 turns off and current continues to flow via rectifiers D2, D4 and D1, D3. The capacitor C becomes charged to a voltage of reverse polarity and TH2 turns off. When TH1 is fired the next time in the normal operating sequence, C discharges via D5 and L; its voltage assumes the original polarity (shown in FIG. 5) and the circuit is ready for the next commutation.

With this arrangement, the number of main cycloconverter thyristors and commutating capacitors is halved, compared to the preceding circuit. This results in slightly better component utilization. However, this circuit is also load sensitive. It is clear that as soon as TH1 turns off, the load current (assuming an inductive load) will continue flowing via D2, D1 (or D4, D3) and the commutating circuit. The final charge on C is therefore dependent upon the load current. The other disadvantage is that the polarity of the capacitor voltage must be reversed for the next commutation (i.e., the LC circuit must be operated twice for each conduction interval of TH1). This increases the losses within the commutation circuit and also the rating for TH1.

Beside specific disadvantages the above circuits have a common disadvantage in that their commutation capability is load dependent. Therefore, for reliable operation under all conditions additional components would be required.

B. Input Line Commutation

Figure 6:
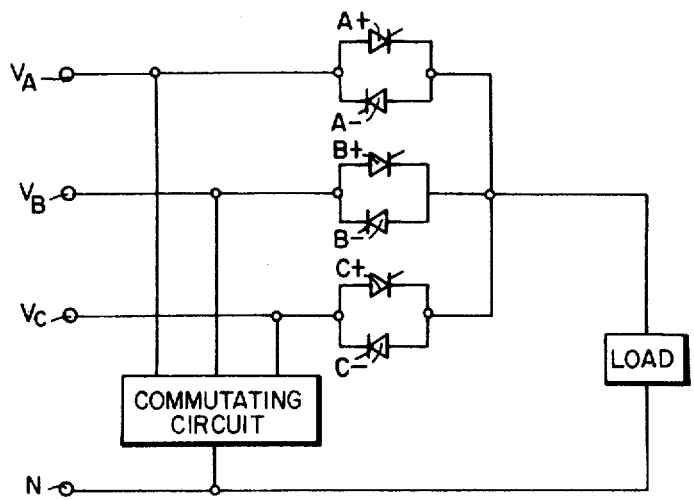
FIGS. 6 and 7 show two basic arrangements of the prior art for input line commutation, one for the Wye configuration (FIG. 6) the other for the bridge configuration (FIG. 7)
Figure 7:
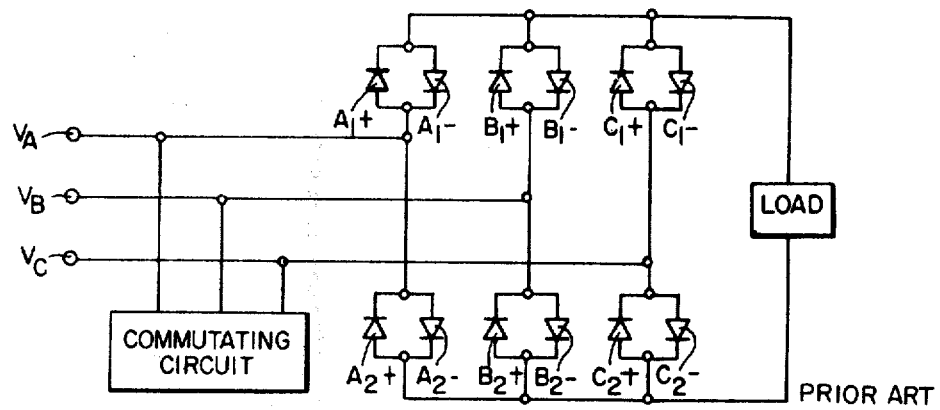

Basic input line commutation arrangements for a cycloconverter in a Bridge or Wye configuration are shown in FIGS. 6 and 7 respectively. The operation of the commutation circuit in each arrangement is basically the same. Consider for the sake of discussion the Wye configuration (FIG. 6) and assume thyristor A+ is conducting and the phases are in the relation $V_A > V_B > 0$. Suppose now that one wished to turn B+ ON and commutate thyristor A+ OFF.

To commutate thyristor A+ OFF, it is necessary that the commutation circuit decrease the input line voltage, $V_A$, below $V_B$ in order to reverse bias thyristor A+. Similarly at each commutation instant the voltage of the input line feeding the conducting "outgoing" thyristor must be forced to drop below that of the line feeding the "oncoming" thyristor. If one considers a three phase cycloconverter it is clear that each output phase should be treated as a separate single-phase unit and that the inputs to each unit be isolated from the others to prevent undesirable interaction of the commutation circuits. In general, such operation is not desired. Input line commutation requires that either separate commutating circuits be provided for each input line, or that several common commutating circuit be used and connected appropriately to each input line by "steering" thyristors.

For the above reasons it is felt that any technique based upon input line commutation will require an excessive number of components and, therefore, this approach was not investigated any further.

C. Load Commutation

Figure 8:
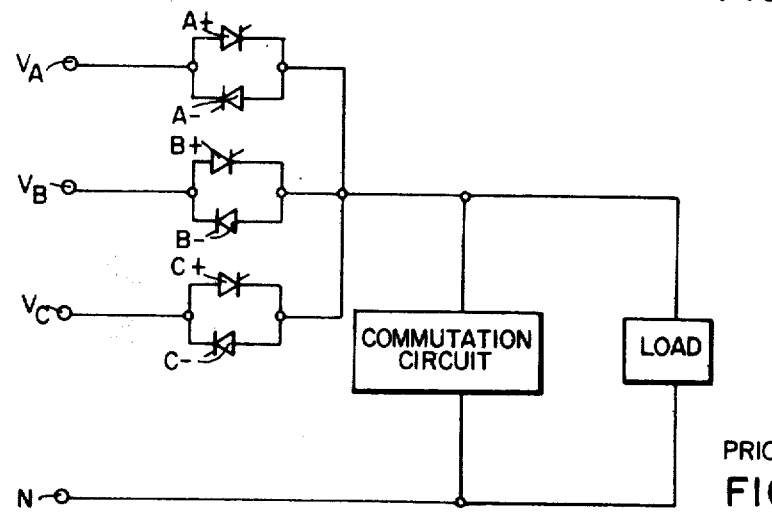
Figure 9:
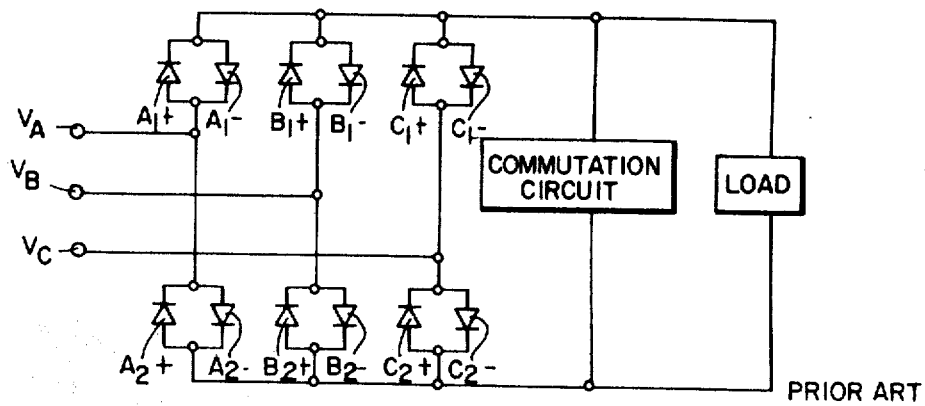

Basic load commutation arrangements for a cycloconverter in Wye and Bridge configurations are shown in FIGS. 8 and 9, respectively.

Figure 10:
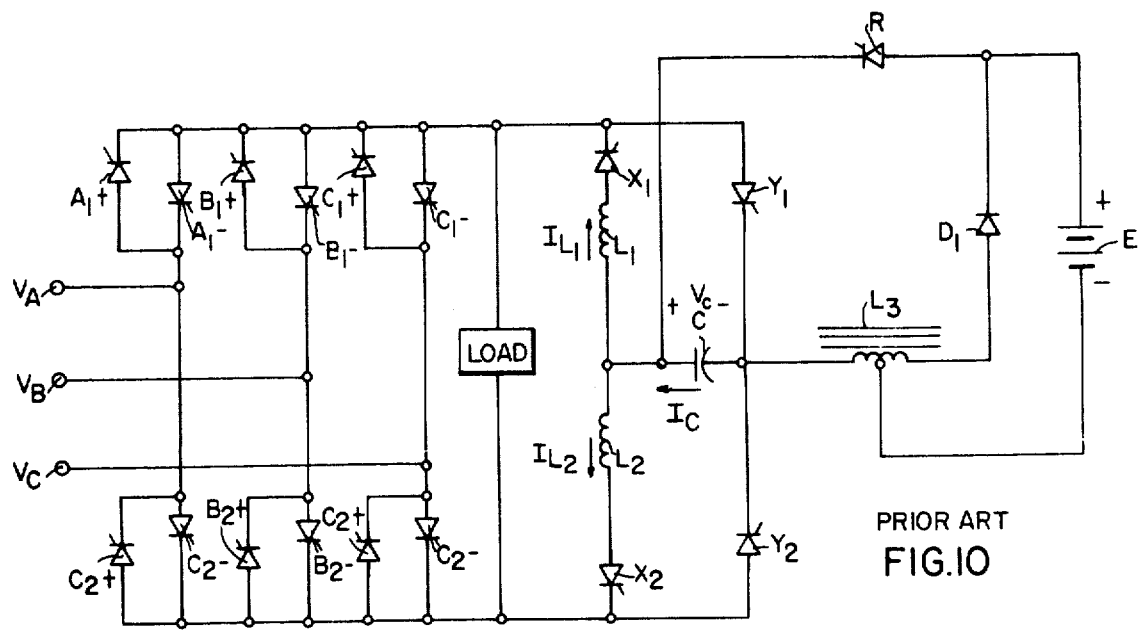
FIG. 10 shows a prior art circuit which is typical of load commutation of a cycloconverter, and FIG. 11 provides the curves illustrating operation of the circuit of FIG. 10.
Figure 11:
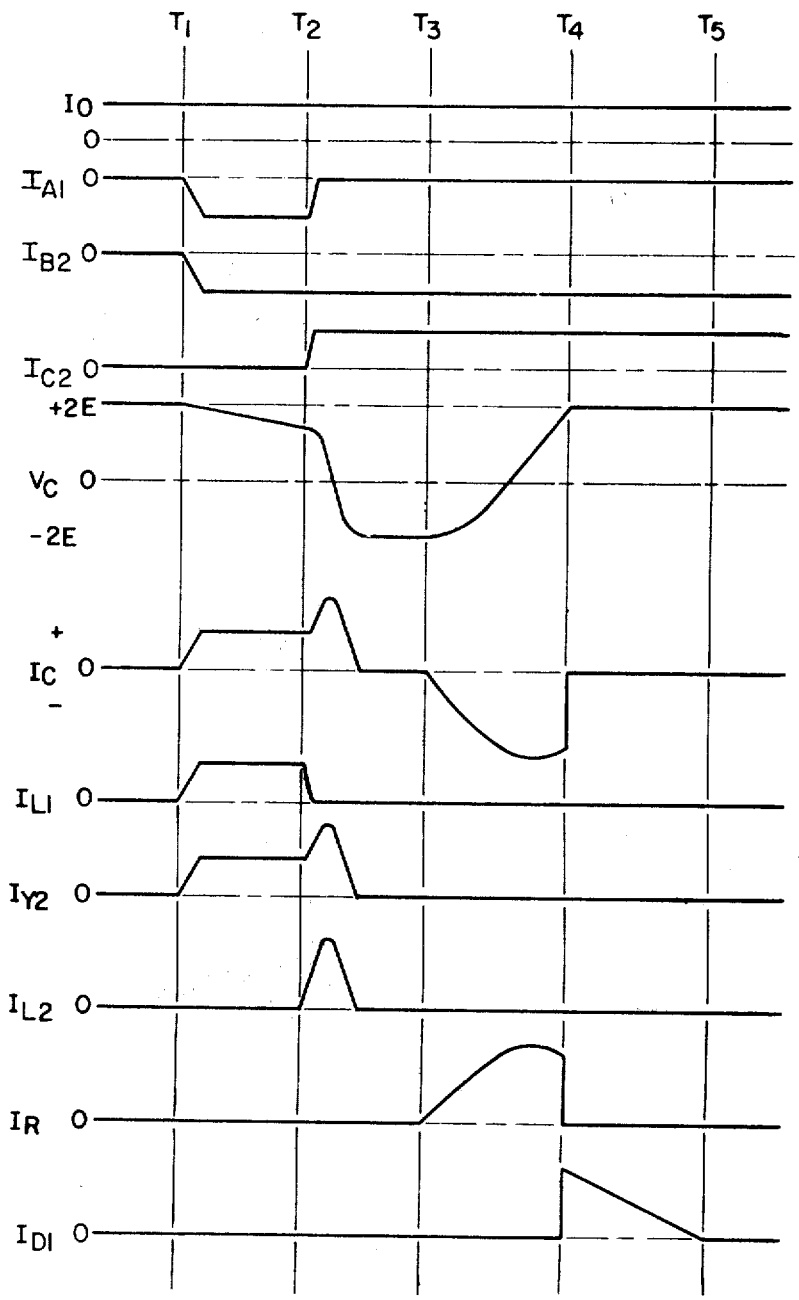

FIG. 10 shows a known circuit which is typical of load commutation. This circuit has been described by L. Gyugyi in "A Study on the Application of the Force Commutated Cycloconverter for Variable Speed Control of A.C. Machines" M. Sc. Thesis - Universtiy of Pittsburgh, 1967. The operation of this circuit is illustrated by the waveforms shown in FIG. 11. It is assumed that the load current ($I_o$) is positive and that its magnitude remains constant throughout the commutation interval, that an initial voltage $V_c$, greater than the peak line to line voltage, is present on capacitor C with the polarity as indicated, and that thyristors A1+ and B2+ are conducting when commutation from thyristors B2+ to thyristor C2+ is to be effected.

To initiate commutation, auxiliary thyristors $X_1$ and $Y_2$ are fired at time T1. Thyristors A1+ and B2+ are reversed biased and turned off. The load current continues to flow via $X_1$, $L_1$, C and $Y_2$, and begins to discharge capacitor C.

After sufficient time for recovery of the main cycloconverter thyristors, at time T2, the next thyristors in sequence, A1+, A1− and C2+, C2− are fired. Since a positive load current is assumed, thyristors A1+ and C2+ will conduct placing $V_{A-C}$ across the load. At this time thyristor $X_2$ is also fired causing the current in $L_1$ and $X_1$ to decrease to zero. Therefore, $X_1$ turns off, while the current in $L_2$ and $X_2$ resonantly builds up. Due to this resonant current flowing in $L_2$, $X_2$, $Y_2$ and C, the voltage on C is therefore reversed. The firing of $X_2$ is important because it ensures than now the original state of the circuit can be re-established due to the action of a "clamped resonant recharging circuit," independently of the load. Firing $X_2$ insures that the voltage on C will be of opposite polarity (negative) prior to firing thyristor R. Under this condition the recharging circuit consisting of thyristor R, diode D1, inductor L3 and the DC supply E can restore the original voltage of the commutating capacitor.

At time T3, thyristor R is fired. Since the voltage on C has been reversed (bottom plate positive), the capacitor starts to charge resonantly to a voltage higher than 2E. The voltage across the left hand side winding of L3 cannot however increase above E because at this voltage, diode D1 starts to conduct. The energy stored in L2 therefore ceases to charge C any further and thyristor R turns off at time T4. The remaining energy stored in L3 is then fed back to the DC supply, it decays to zero at time T5. The final result is that the commutation capacitor is now charged back to the original potential (2E). The circuit is now ready for the next commutation.

Operation of this circuit is such that the full commutating ability is always available independent of the operating conditions, and a good utilization of commutating components is achieved since a single commutating circuit achieves commutation of all main thyristors (in a single phase system).

It is recalled in both individaul and input line commutation, that the commutation pulse was applied at a separate point for each main thyristor of the cycloconverter. This requires that many individual commutating circuits be used. For this operation to be reliable, independent of load current and instantaneous voltage levels, each individual commutating circuit would have to comprise many components and the total number of commutating components would become excessive. With load commutation however, the commutation pulse is applied at a point common to a number of main thyritors, and the number of separate commutation circuits required is therefore reduced. With the number of commutating circuits and thyristors reduced the basic control can also be simpler.

THE BASIC FORCE COMMUTATION CIRCUIT OF THE INVENTION

Firstly, the commutation circuit according to the present invention generally belongs to the category load commutation, that is, forced commutation is applied at the load or output side of the main cycloconverter switches although it is susceptible of being applied to the input side in sequential instances, for instance, under the cycloconverter is used in the reverse direction of power flow.

Secondly, commutation is effected according to the present invention by an auxiliary source providing a commutating voltage which is switched in at the appropriate moment to commutate OFF one main cycloconverter thyristor and assume conduction of the load current momentarily until the next thyristor in sequence can be turned ON.

These two features of the present invention will appear more clearly from the following description of the basic circuit and of several possible configurations of a cycloconverter so commutated which will be discussed in detail hereinafter.

Nearly all commutating circuits actually depend either directly or indirectly on the use of a predetermined voltage to effect forced commutation. The commutating circuit which is the main feature of the cycloconverter according to the present invention makes use of the chopper technique. A DC voltage is switched in circuit at the moment of commutation in order to apply the DC voltage at a common output of all the thyristors of the cycloconverter of a group including the thyristor to be turned OFF. Many different circuit configurations are possible. Chopper commutation is directly applied to the cycloconverter output and can be used for either "Bridge" or "Wye" connections.

The present invention calls for an auxiliary voltage source having a potential higher than the peak line to neutral input voltage, applied to the main switch to be commutated. The auxiliary source is switched in and out, to momentarily assume the load current between two consecutive conduction periods of the main cycloconverter thyristors. In order to obtain good thyristor utilization, the main thyristors of a cycloconverter are usually divided into three pulse groups, which sequentially switch three equally (120°)displaced input voltages to the load. Each three pulse group comprises three thyristors to provide positive load current, and three more to provide negative load current. Considering a set of thyristors used to provide one polarity of load current, a condition that must be met for natural commutation to occur is that the "oncoming" thyristor be fed from an input at a higher potential than the "outgoing" thyristor. If this is not the case, a fourth auxiliary thyristor added to the three pulse group can be used to momentarily switch in an auxiliary input voltage of higher potential and appropriate polarity, to cause the previously conducting main thyristor to turn off. The auxiliary voltage source would then supply the output current until the auxiliary thyristor itself could be commutated off. By using such an arrangement the problem of commutation is effectively transferred from each of the main cycloconverter thyristors in turn, to the auxiliary thyristor. To insure that the auxiliary thyristor will always turn off, two basically different approaches are considered.

Figure 12:
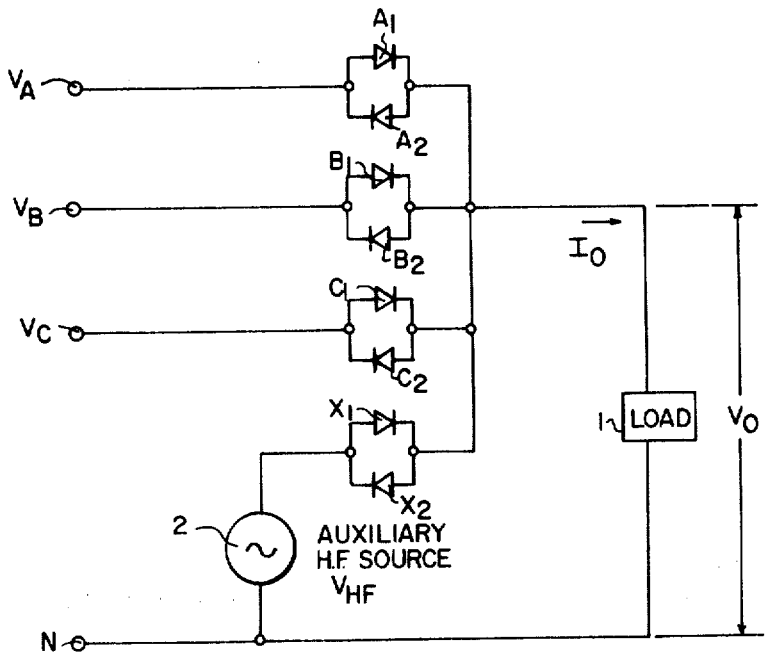
FIG. 12 shows commutation by an auxiliary high frequency AC voltage source of cycloconverter and FIG. 13 illustrates how the three input phases are brought under favorable voltage relation for commutation by the AC voltage source of FIG. 12.
Figure 13:
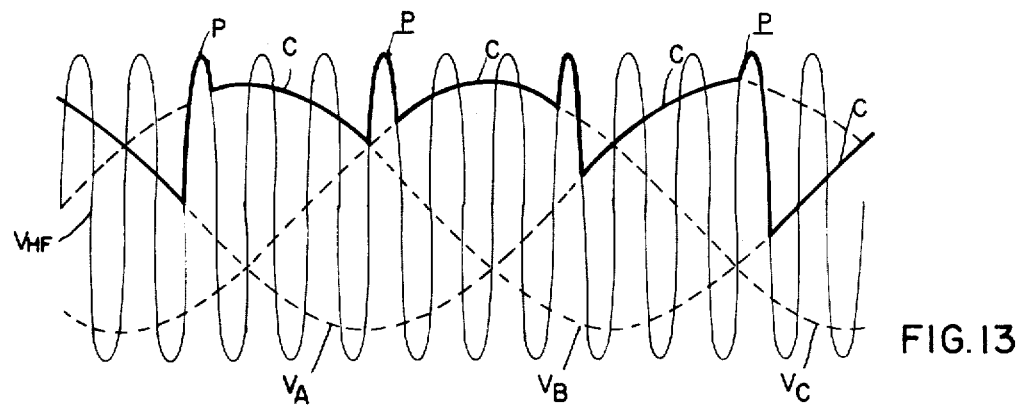

In the first approach natural commutation of the auxiliary thyristor is made to occur by using a high frequency auxiliary voltge source 2 having a magnitude P greater than the main cycloconverter input C as illustrated in FIGS. 12 and 13. Auxiliary thyristors $X_1$, $X_2$ are used to switch the high frequency voltage source to the common point of the main thyristors $A_1$, $A_2$ to $C_1$, $C_2$. Realization of this approach is practical if the required instants of commutation were to occur at regularly spaced intervals at some sub-multiple of the high frequency auxiliary source, i.e., as in the Unrestricted Frequency Changer (U.F.C.); alternatively the frequency of the auxiliary source could be made very high so that commutation could be made to occur almost at any desired instant.

Figure 14:
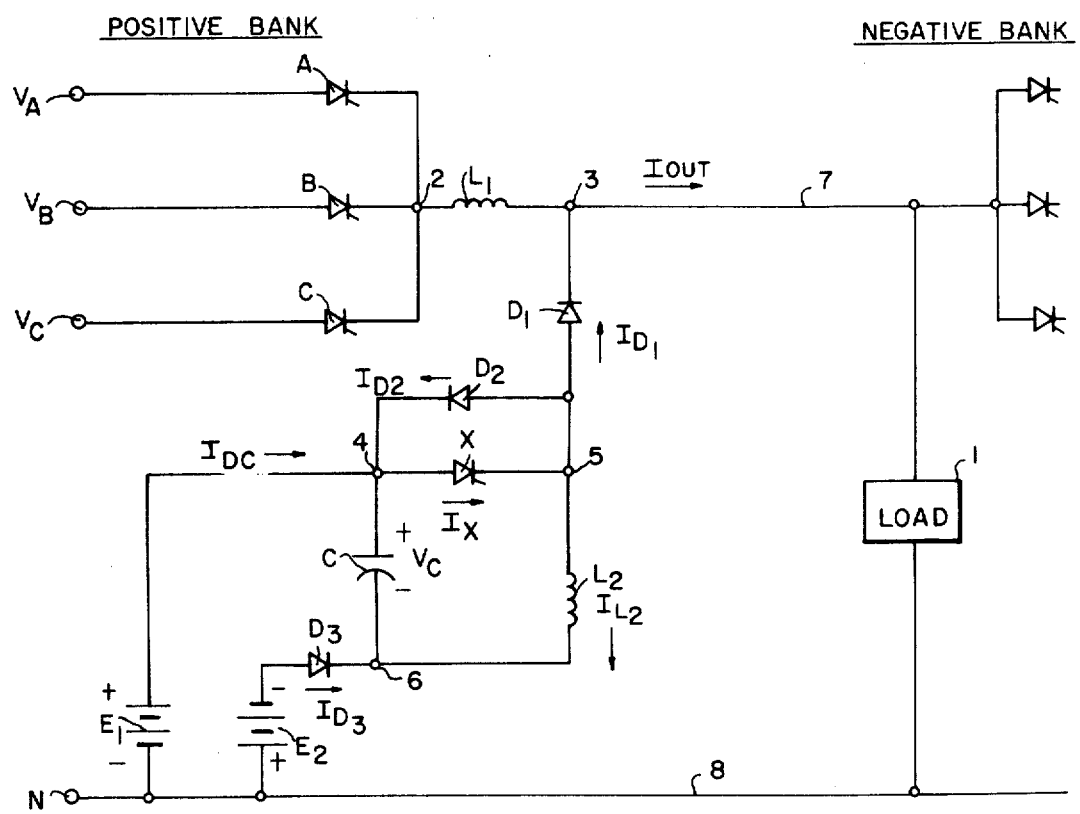
FIG. 14 shows the basic DC chopper forced commutation circuit used in accordance with the present invention on the positive bank of a cycloconverter.

This train of thought leads to the following approach in which a "source" is used to provide commutating pulses at any isntant required. In this alternative approach a DC auxiliary voltage source is used and a self commutating "chopper" arrangement is used to provide a means of forced commutation for the auxiliary thyristor as shown in FIG. 14. FIG. 14 shows a typical type of "DC chopper" suitable for forced commutation of a cycloconverter in accordance with the present invention. However, it is understood that other chopper circuits can be used for the same purpose. The basic circuit illustrated in FIG. 14 pertains only to a portion of a cycloconverter, comprising three phases $V_A$, $V_B$, $V_C$ supplying AC power to a load, although a set of thyristors A, B, and C for the respective phase. The junction point 2 at the cathod side of the three thyristors is connected to one end of the load 1 through line 7 of the interposition of an inductance $L_1$, although inductance $L_1$ is not necessary to the proper operation of the commutating circuit. The second end of the load is connected to the neutral N of the AC power source through a line 8. The chopper proper is comprising a DC source $E_1$ applying a positive voltage (+E) to point 4 which is the anode side of a commutating thyristor X, the cathode side of which is 5 connected to line 7 via a diode $D_1$. Thus whenever thyristor X is fired, the voltage (+E) of source $E_1$ is applied to point 3, thus to point 2 at the cathode side of all the main thyristors A, B, or C. Associated with the chopper so essentially defined, is a self-commutating circuit for the purpose of turning thyristor X OFF after commutation of the main thyristors has been completed. The particular chopper circuit shown on FIG. 14 uses a resonant circuit for self-commutation of the choper. A capacitor C is connected between the + side of source E at 4 and the negative side at 6 connected to the cathode of a diode D3, having its anode side connected to a second source $E_2$ of voltage −E, which is connected by its positive side to the neutral line 8. Thus between points 4 and 6 the voltage applied to capacitor C is limited to 2E. In addition, an inductor $L_2$ having an inductance which is in resonance with the capacitance of capacitor C is provided between point 5 and 6 to be in series with capacitor C and thyristor X when the latter is conductive. An anti-parallel diode $D_2$ is also mounted between points 4 and 5 in order to limit a reverse voltage to thyristor X when the self-commutating circuit $CL_2$ rings back, thereby to cut-off thyristor X at the proper time. The operation of such a "DC chopper" applied to force commutation of a three pulse single polarity group of thyristors will now be explained. A single DC chopper can be used to force commutate three thyristors of a three pulse group which carry one polarity of load current. Consider for the moment only those thyristors which carry the positive load current ("positive bank") and their associated commutating circuit as shown in FIG. 14.

Figure 15:
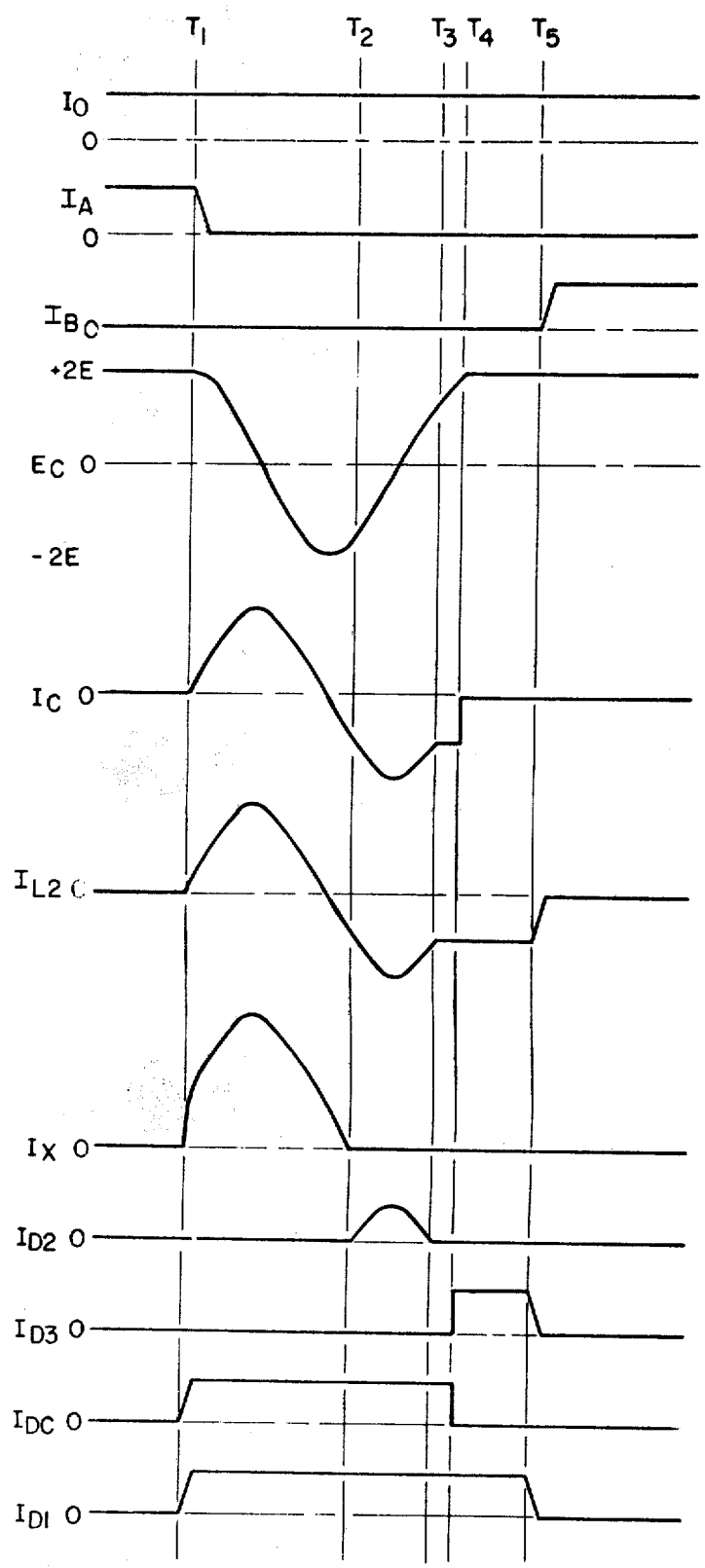
FIG. 15 depicts with curves the operation of the basic chopper forced commutation circuit of FIG. 14.

Assume that initially thyristor A is carrying the load current, $I_o$. Also assume that capacitor C is precharged to a voltage $V_c$ with the polarity indicated. The level of $V_C$ being equal to 2E where E is greater than the peak line-to-neutral voltage. The operation of the commutation circuit is illustrated by the waveforms shown in FIG. 15. Throughout the commutation interval, it is assumed that the load current remains essentially constant.

When it is desired to commutate thyristor A, at time $T_1$, X is fired. The load current is "picked up" by the positive DC source +E through thyristor X and diode D1 at a rate determined by the input inductor L1; when X carries the full load current thyristor A then becomes reverse biased and ceases to conduct. In addition to the load current, thyristor X also carries the resonant discharge current of capacitor, C, which flows in inductor L2. This resonant current changes polarity when the capacitor voltage reaches its negative peak, and ceases to flow in thyristor X when the magnitude becomes equal to the load current, at time T2. During the interval form T2 to T3 the negative discharge current exceeds the load current and the excess current flows in diode D2, creating a forward drop across D2 which reverse biases thyristor X causing it to cease conducting. At time, T3, the resonant current has fallen in magnitude to equal the load current (thus ending the commutation period for thyristor A) and diode D2 ceases to conduct. The load current is now supplied from the lower plate of the capacitor through inductor L1, and the capacitor continues recharging. The final charge on capacitor, C, is limited to its original value at time T4, after which the clamping diode D3 conducts the load current $I_o$ until the next main thyristor in sequence, B, is fired at time T5. Thyristor B then takes over conduction of the load current at a rate limited by the inductors L1 and L2.

It may be noticed that the load current is drawn from the positive supply during the interval from T1 to T4, and charges the negative supply during the interval from T4 to T5. Since the interval from T4 to T5 can be controlled by changing the instant at which thyristor B is fired, all the energy drawn from the positive supply can be transferred to the negative supply. As a result, if a cycloconverter consisting of two similarly commutated positive and negative current carrying groups of thyristors is operated in this manner the DC supplies can be replaced with DC reservoir capacitors (i.e., electrolytic capacitors). However, to minimize the total commutation period, as may be desired in high frequency applications, the interval from T4 to T5 must be kept to a minimum and external DC sources are required.

Figure 16:
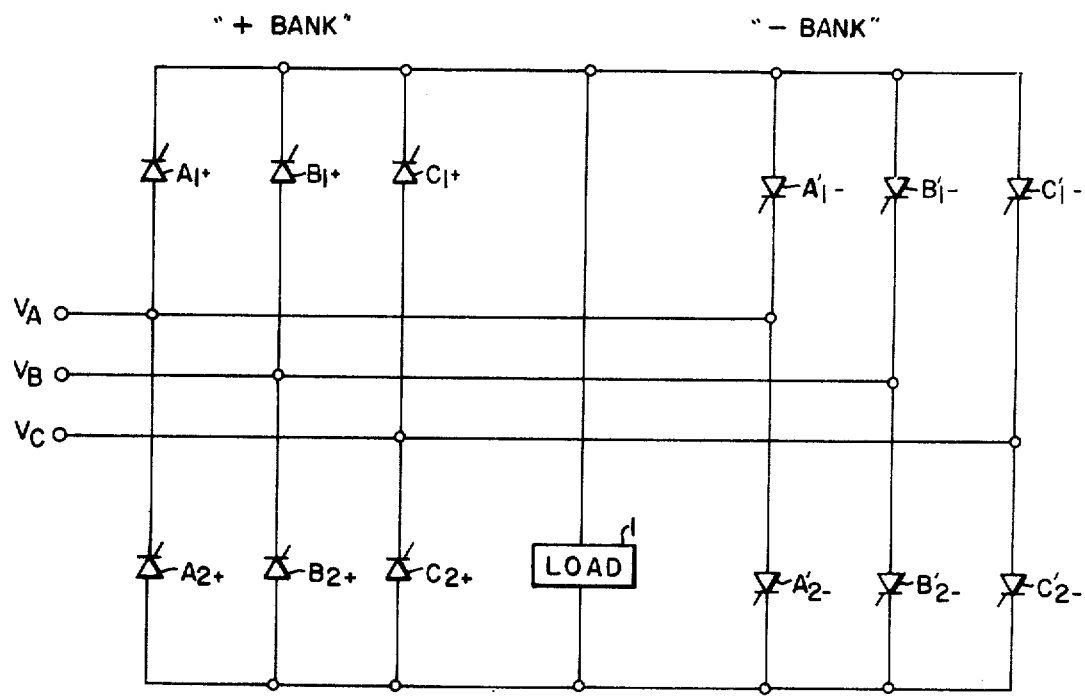
FIG. 16 shows a basic cycloconverter bridge configuration.

A basic bridge cycloconverter consists of two inverse parallel connected thyristor bridges as shown in FIG. 16. Since each bridge can provide load current of only one polarity, it can be regarded as a "bank." Only one bank is allowed to conduct at any instant. The normal conduction sequence for each bank is such that each device conducts for one third of the time, and is commutated in the sequence A1, C2, B1, A2, C1, B2, A1, and so on. The "upper" devices (index$_1$) are commutated alternately with the "lower" devices (index$_2$).

Figure 17:
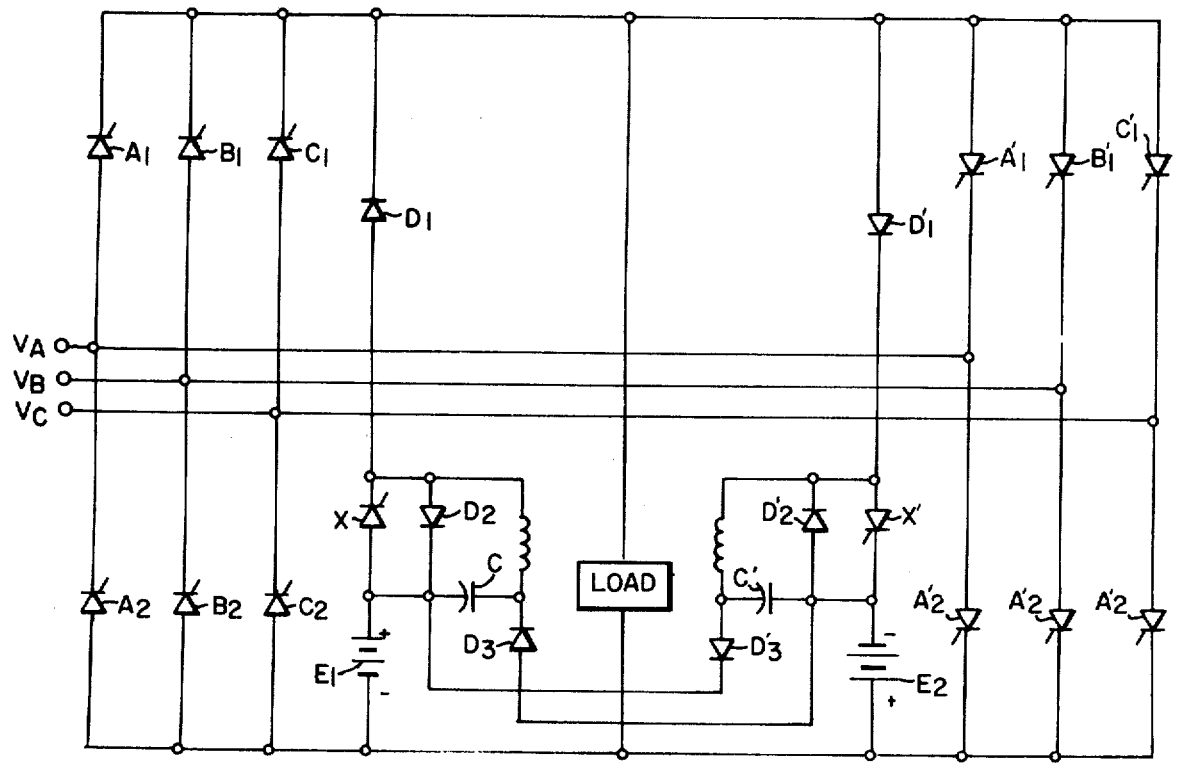
FIG. 17 shows a single phase bridge of cycloconverter using DC chopper commutation in accordance with the present invention.
Figure 18:
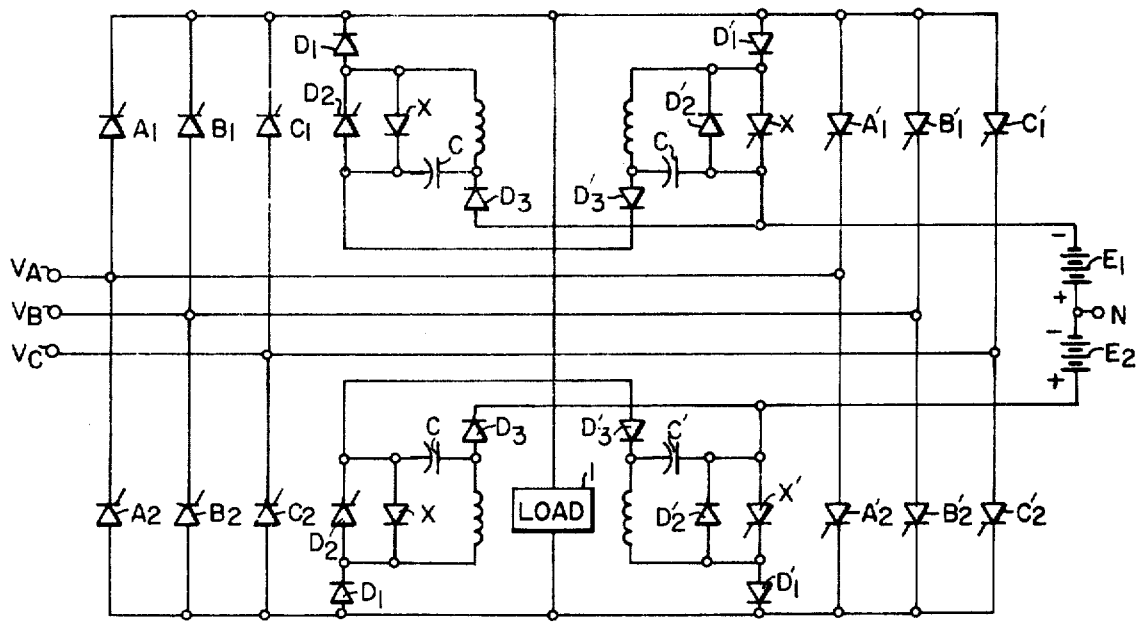
FIGS. 18, and 19 show two more configurations of a single phase bridge cycloconverter using DC chopper commutation.
Figure 19:
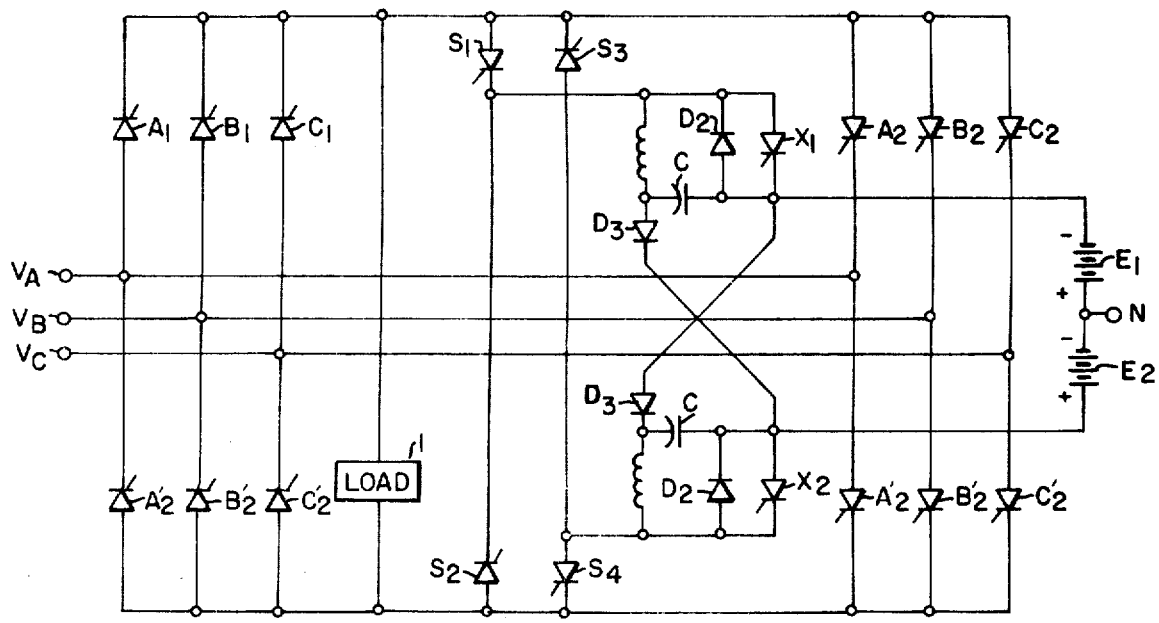

Three alternate connections of the chopper commutation circuit for a single phase bridge cycloconverter are presented in FIGS. 17, 18 and 19.

For a single phase bridge operation with the DC chopper combination of FIG. 17, two separate chopper commutating circuits are used. Here the main thyristors are commutated off in pairs. Thus, in this arrangement for instance $A_1$ and $C_2$ are conducting together at the instant of commutation for thyristor $A_1$, $C_2$ will automatically be turned OFF by the commutation of $A_1$. At the next sequence $B_1$ and $C_2$ being together to be conductive, $C_2$ must be refired at the same time as $B_1$.

With the "DC chopper" commutation of FIG. 18, four separate chopper commutating circuits are provided identified by letters which are similar to those used in FIG. 14. As a result, the upper and lower thyristors of each main cycloconverter bridge can be separately commutated. Although more components are required, the pulse repetition frequency (P.R.F.) of the individual commutating circuits is halved, therefore, this arrangement is suitable for higher frequency operation.

The arrangement of FIG. 19 uses only two basic "chopper" commutating circuits. Separate commutation of the upper and lower devices can still be retained, and thus "refiring" is not needed. However, four "steering" thyristors, S1 to S4, are now required.

In a single phase cycloconverter comparatively poor utilization of the commutation circuit is obtained because of the time varying output current; at cetain instants the circuit must be capable of commutating the peak currents, while at other times it will not be fully used. This shortcoming can be overcome in certain three phase applications where commutating circuits common to three output phases can be employed as explained hereinafter by reference to FIG. 23.

SINGLE PHASE WYE CONFIGURATIONS

Figure 20:
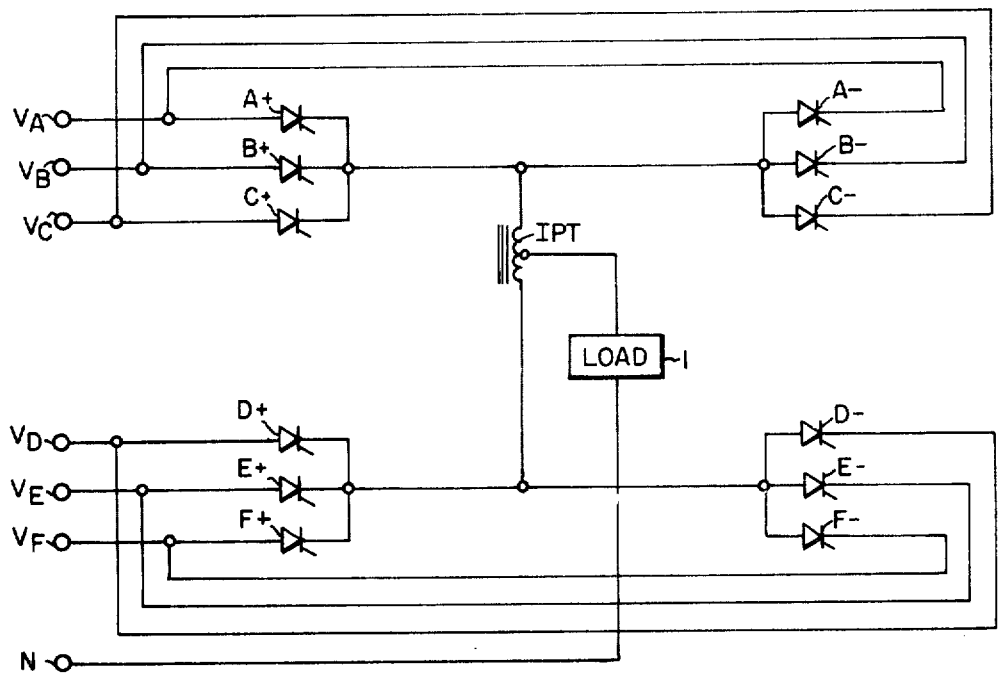
FIG. 20 shows a six pulse cycloconverter configuration using a double Wye connection with an interphase transformer.

In order to obtain good device utilization and low output ripple, a dual three phase "(six phases) usually called 6 pulse system," with a single interphase transformer IPT centrally tapped to the load can be used to provide six-pulse output on the load 1 from the central tap of the interphase transformer IPT as illustrated in FIG. 20.

To provide an alternating current output two groups or "banks," of thyristors are used. The positive bank carries the positive load current and the negative bank carries the negative load current, only one bank is allowed to conduct at a time. The normal conduction sequence for the thyristors in each bank is A through F, with devices A, B, C being alternately commutated with devices D, E, F. In order to effect force commutation in the required sequence separate commutation pulses are alternately provided to each three pulse group of thyristors in each bank.

Figure 21:
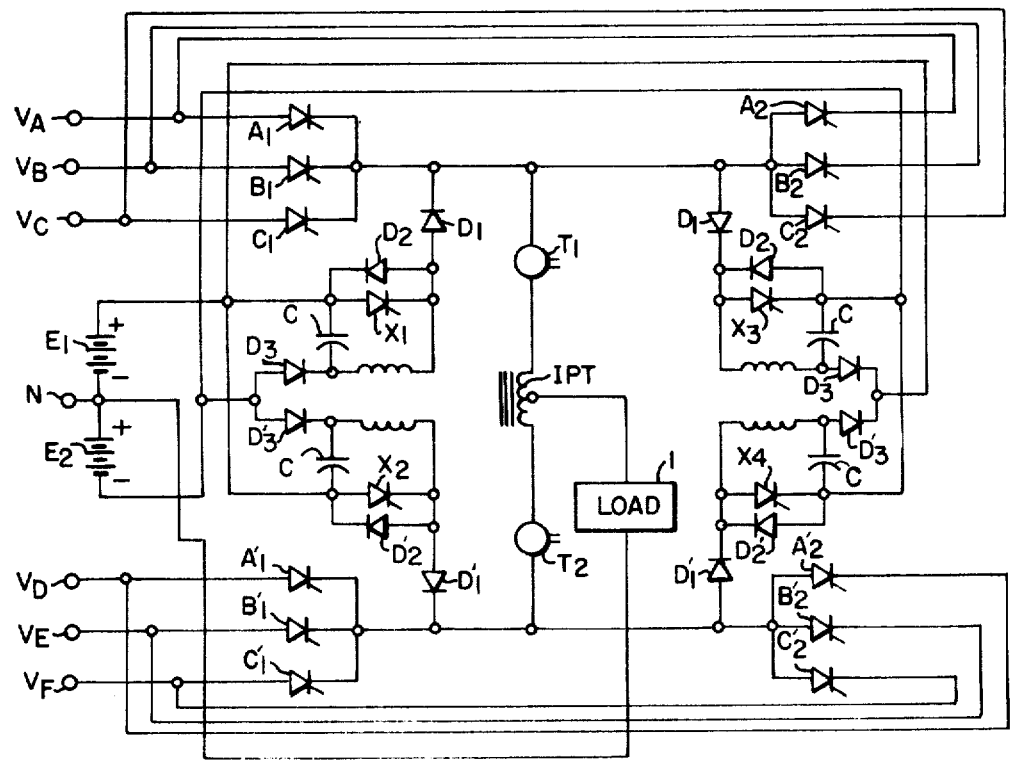
FIGS. 21 and 22 show two configurations of the DC chopper commutation circuit in the single phase, Wye connected cycloconverter of FIG. 20.
Figure 22:
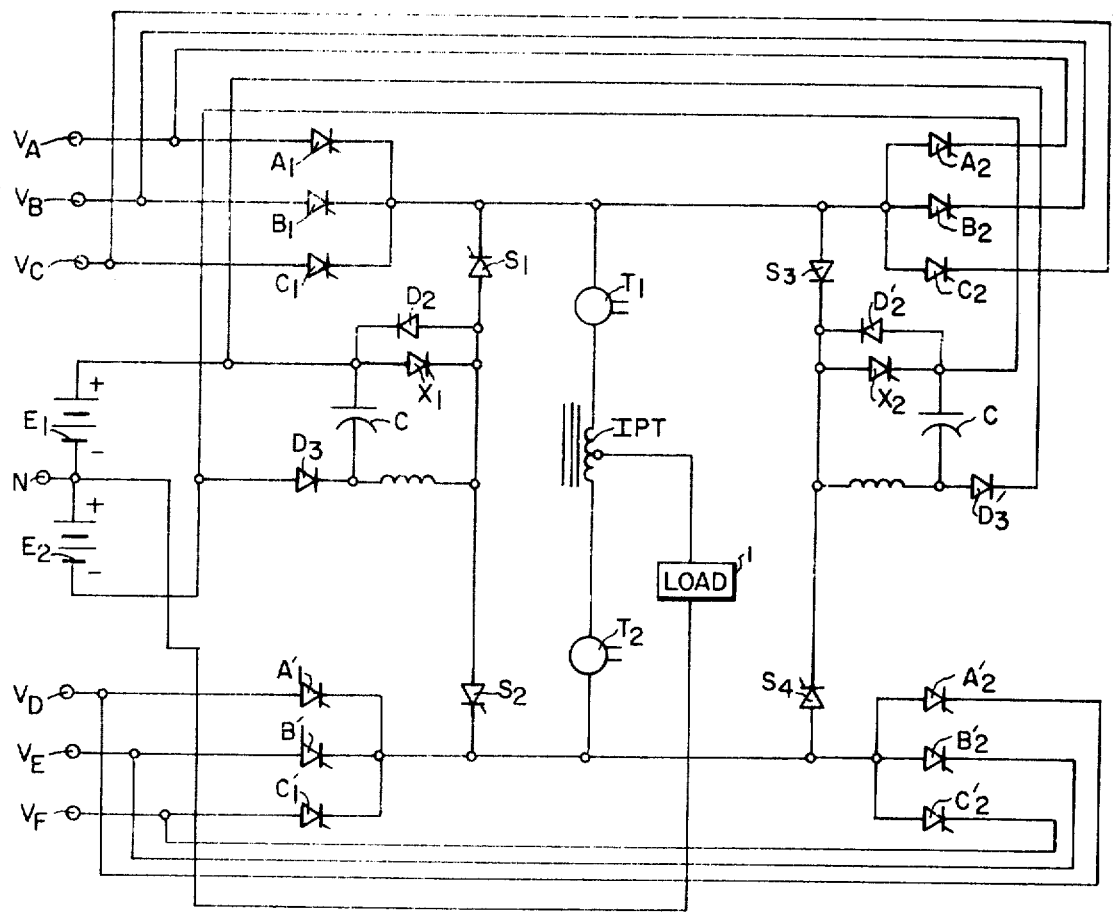

The selected commutating circuits as applied to a single phase Wye connected cycloconverter are presented in FIGS. 21 and 22.

Since only a single interphase transformer IPT is used in each arrangement, the polarity of the output current is sensed at each end of the interphase transformer by devices $T_1$ and $T_2$ as shown, and only the appropriate commutating thyristors are fired.

In the circuit shown in FIG. 21 four DC chopper commutating circuits are used, one for each three pulse group of thyristors. It is possible to eliminate the need for two of these commutating circuits, as shown in FIG. 22. However this would necessitate the use of four additional thyristors such as $S_1$–$S_4$ in FIG. 19 for steering of the commutation pulses.

THREE PHASE CONFIGURATIONS

The circuitry of the force commutated cycloconverter can be considerably reduced in certain three phase configurations.

Figure 23:
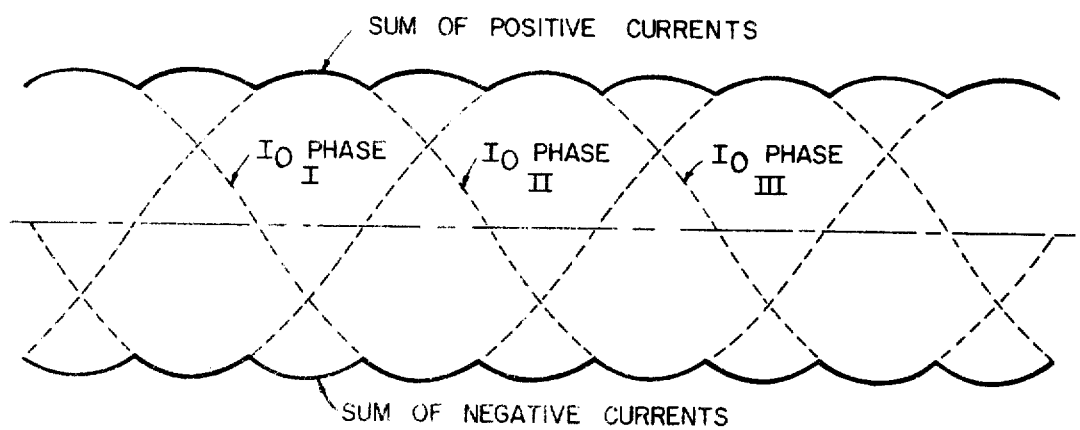
FIG. 23 shows the typical output currents of a three-phase balanced load system in a cycloconverter.
Figure 24:
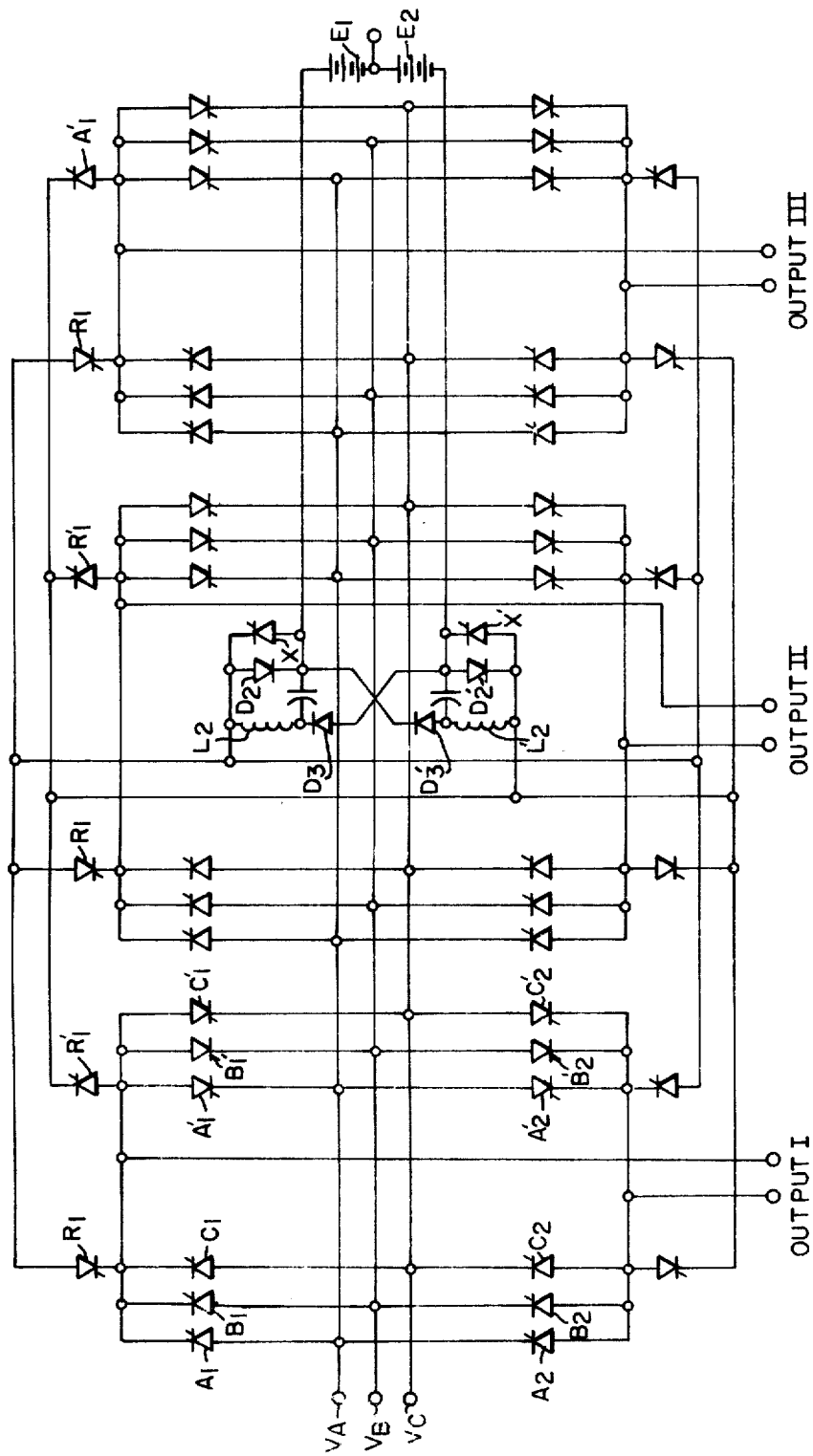
FIGS. 24, 26 and 27 depict three different configurations of a three-phase, bridge connected, cycloconverter employing DC chopper commutation in accordance with the present invention.
Figure 25:
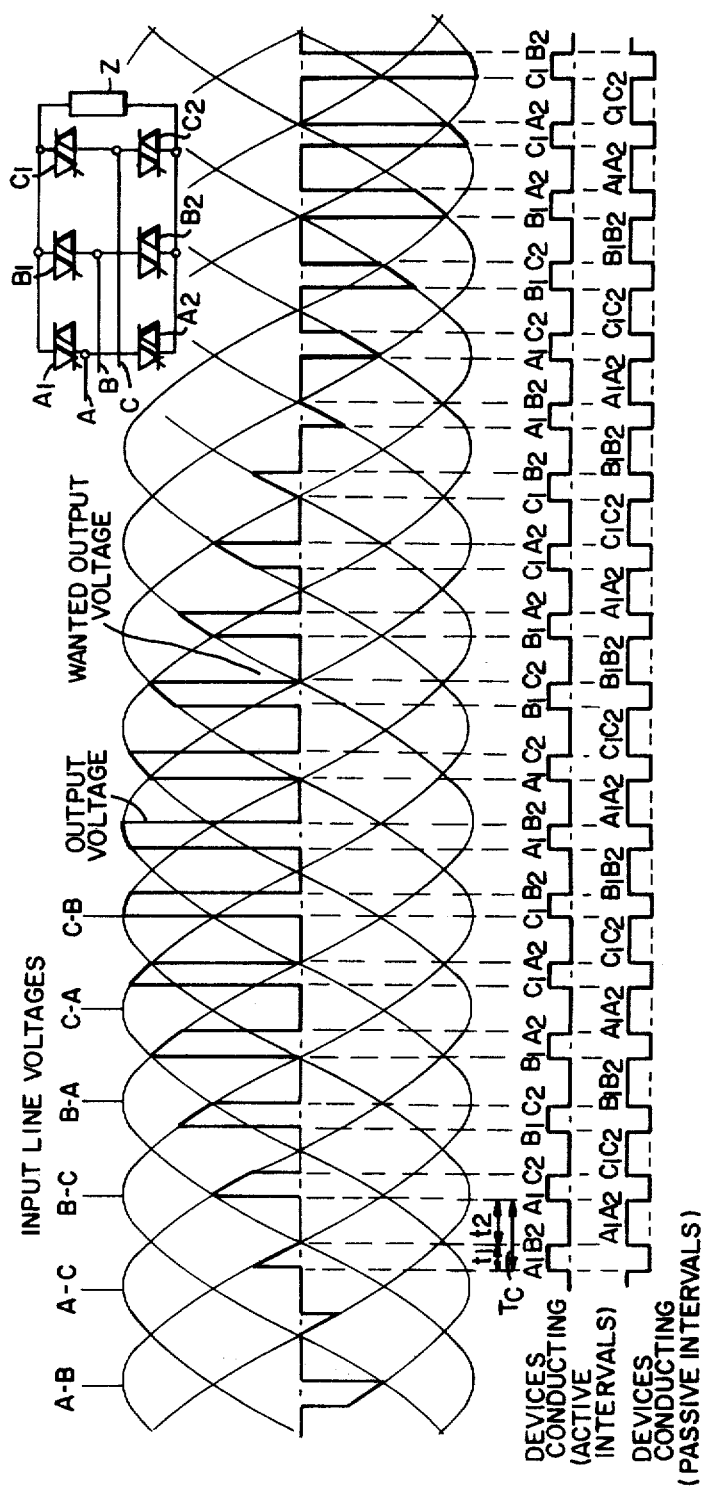
FIG. 25 is typical of the conduction sequence of the switches of a force commutated cycloconverter using pulsewidth modulation for output voltage control which can be used in conjunction with the force commutation circuit in accordance with the present invention.

In the special case of the U.F.C. type cycloconverter operation with balanced loading, considerable circuit simplification and more effective utilization of the commutating components can result when using a "DC chopper" for force commutation. The reasons for the improvement may best be explained by examining the basic relationship between the three phase balanced sinusoidal cycloconverter output currents, as illustrated in FIG. 23. At any instant the sum of the currents which are positive, are equal in magnitude (but opposite in polarity) to the sum of the currents which are negative. These "sum" currents (heavy lines) are relatively constant for a given load and do not exceed the magnitude of a single phase output current (dashed lines). When unrestricted type cycloconverter (U.F.C.) type of operation is employed, commutations occur simultaneously on the three output phases. Therefore by suitably connecting a basic force commutation circuit having the same component values as required for single phase, it may be used to simultaneously commutate all those outputs having the same polarity current at a given instant, although a complete three phase cycloconverter requires at least two such force commutating circuits, as illustrated in FIG. 24. In this particular case while the two commutating circuits are easily identified between FIG. 14 and FIG. 24 by like numeral and letter references, it is observed that diode $D_1$ appears here as a thyristor $R_1$ (or $R_1'$) for steering the proper ones of the output phases I, II or III.

the "DC chopper" commutation circuits described can be readily modified to accommodate different operating condition and circuit configurations. For instance, to provide as generally known voltage control in the cycloconverter by pulse width modulation in a high frequency system as illustrated in FIG. 25, the commutating circuit may have to be duplicated.

Figure 26:
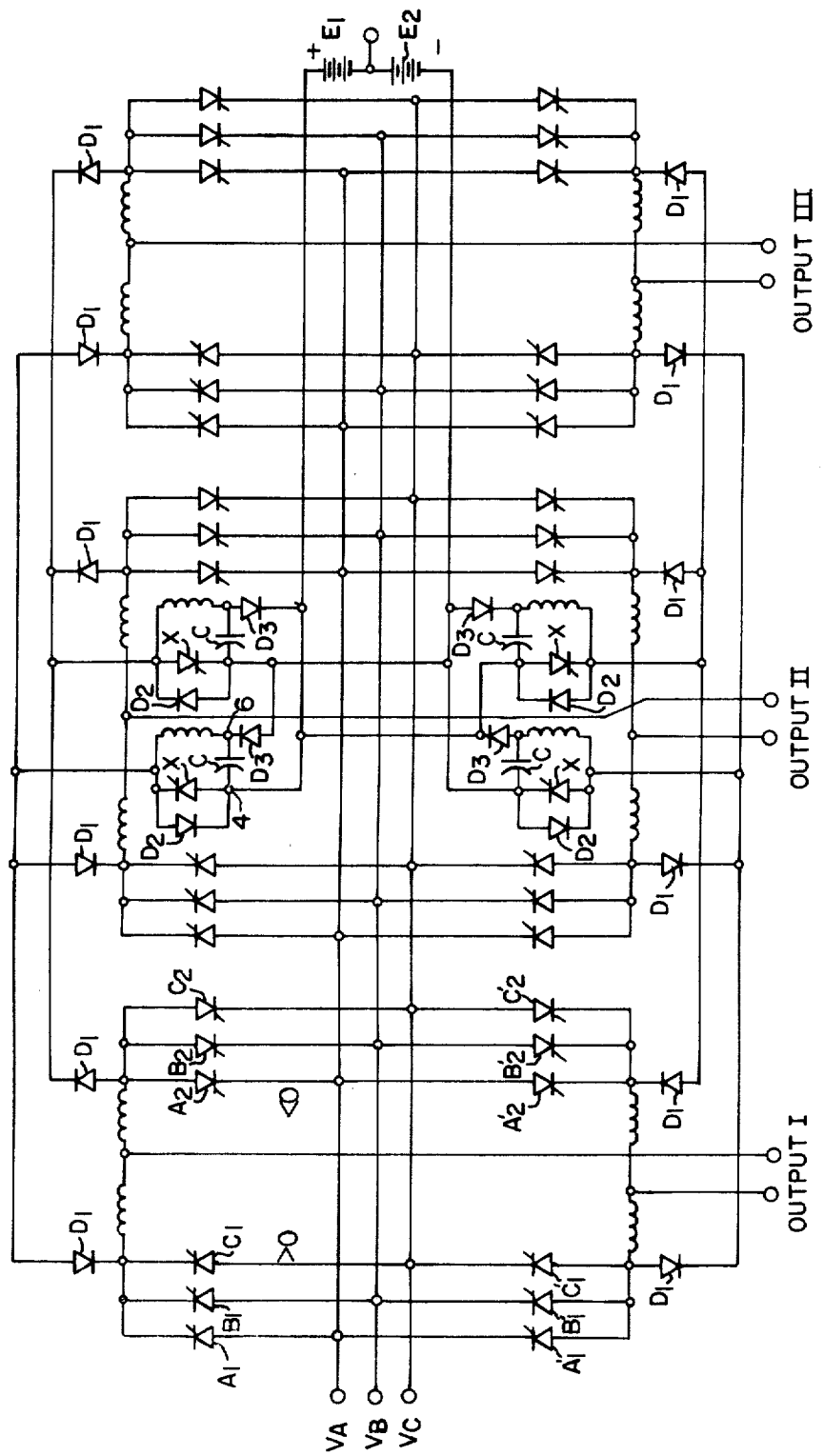
Figure 27:
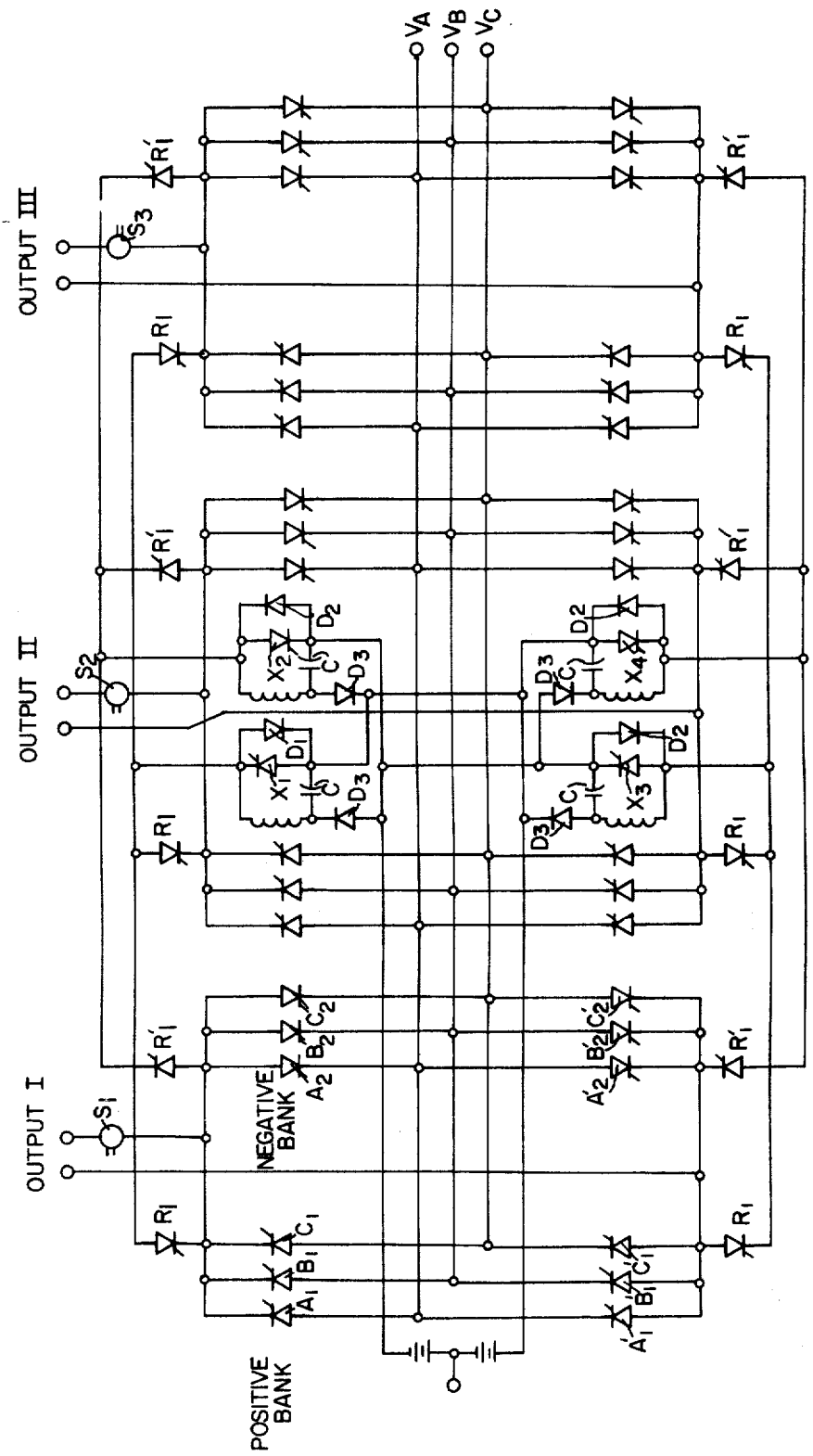
Figure 28:
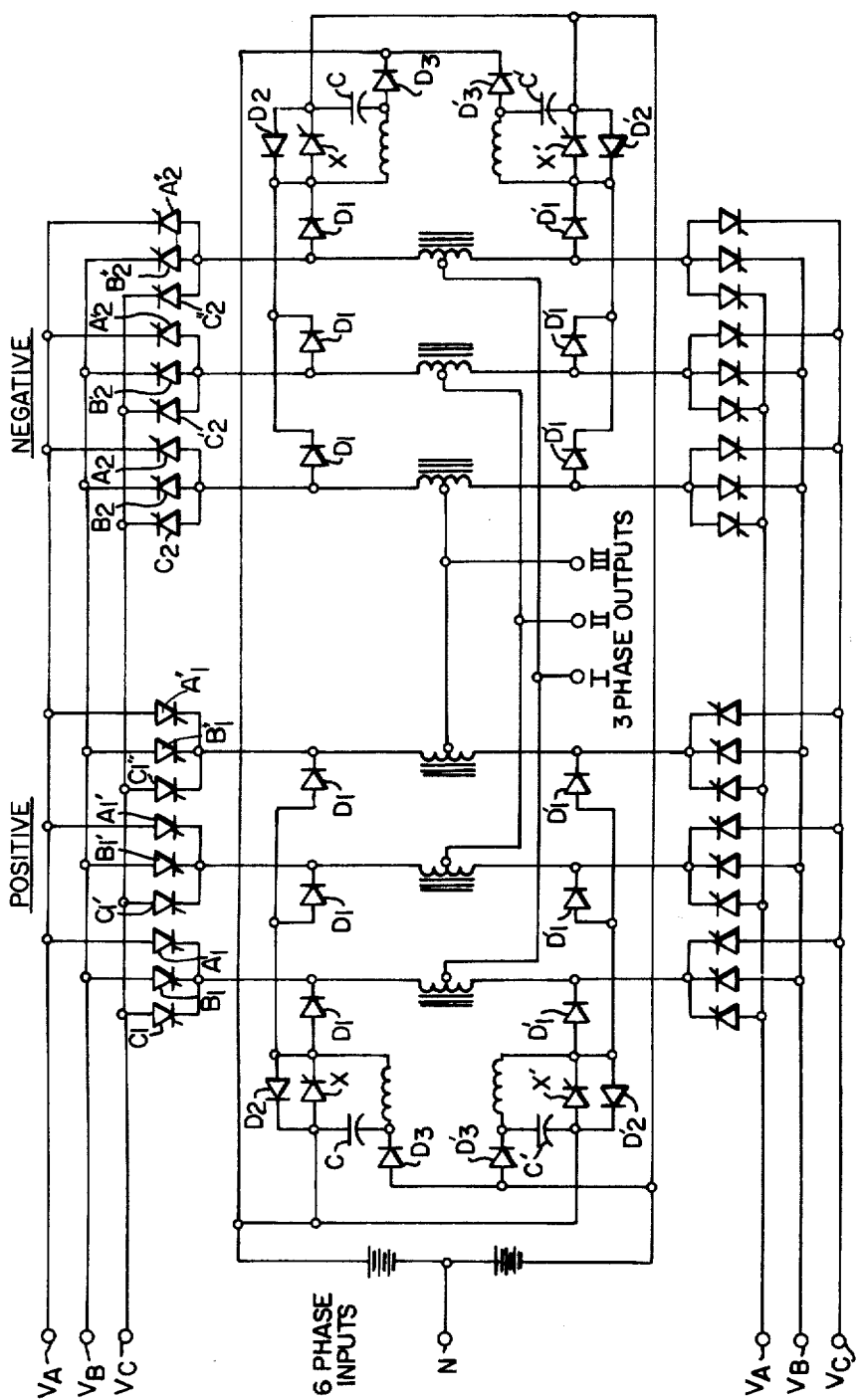
FIG. 28 depicts a three-phase, Wye connected, UFC cycloconverter using DC chopper commutation in accordance with the present invention.

Some more alternative three phase connections are illustrated in FIGS. 26, 27 and 28.

Figure 30:
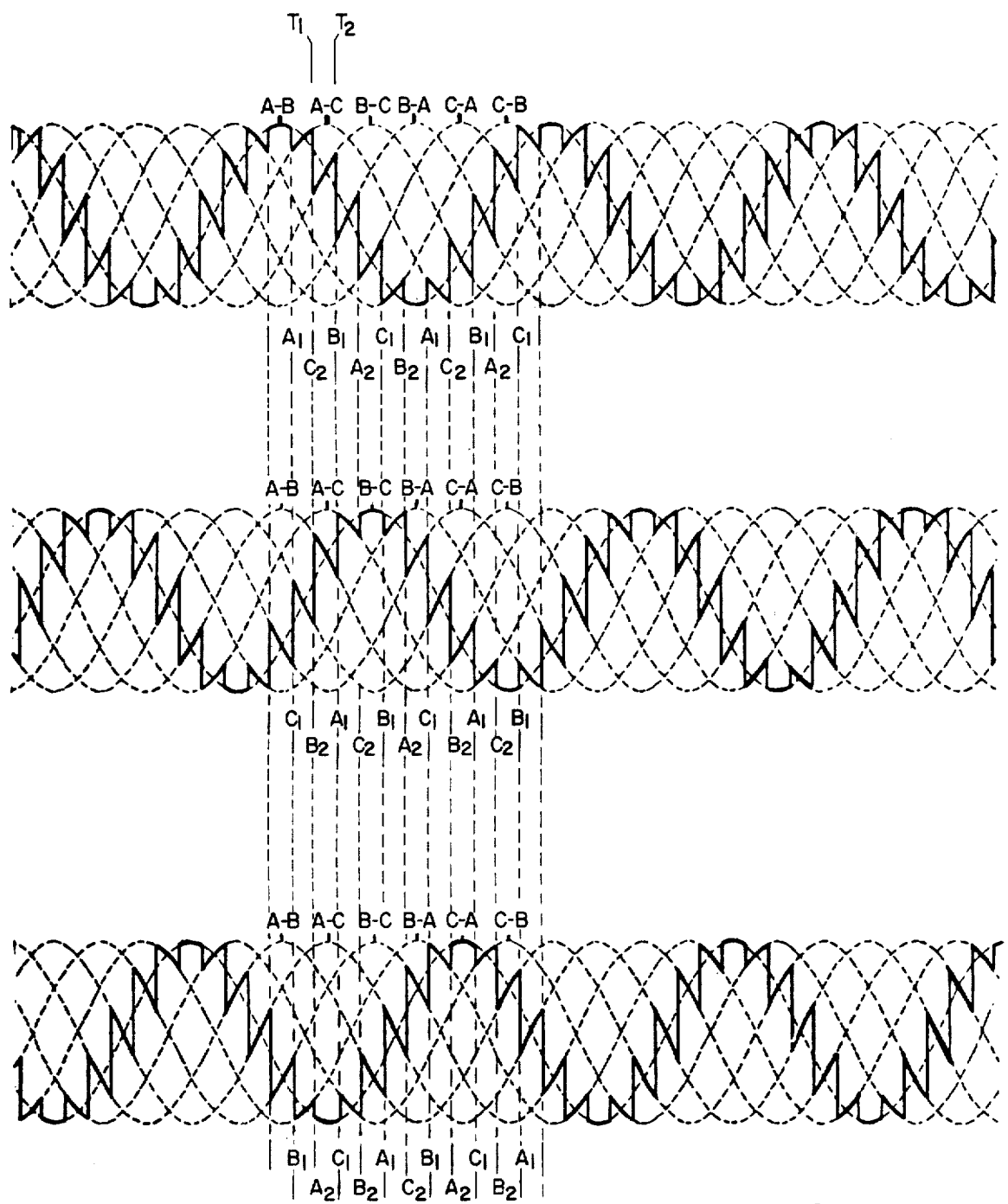
FIG. 30 shows the basic conduction sequence of the main switches of a force commutated cycloconverter of the unrestricted frequency changer type with the switches being in the three phase "bridge" configuration shown in FIG. 25.

FIG. 26 shows four DC chopper forced commutating circuits applied to a three phase bridge connected cycloconverter where there are simultaneous commutators applied to all main thyristors of all phases. The conduction pattern is well-known and as illustrated by FIG. 30 for U.F.C. cycloconverter operation. It is observed that with this simultaneous commutation there is no need for sensing the polarity of the load current. It is also noted that after each commutation there is a need for firing all main thyristors in accordance with the sequence pattern of FIG. 30. The forced commutating circuits are shown in FIG. 26 with like letters as compared to FIG. 14. However, the $D_1$ diodes are here used three in prallel for one particular force commutating circuit.

FIG. 27 differs from FIG. 26 in that the diodes, $D_1$ are now replaced by thyristors $R_1$ and $R_1'$ in order to apply the commutation selectively according to the direction of load current in each output phase. The load current polarity sensing devices are shown at $S_1$, $S_2$, $S_3$. Thus with this arrangement we no loner have simultaneous commutation of all thyristors but only of those selected in banks which carry the load current just prior to commutation.

FIG. 28 is an example of a six pulse output provided by an interphase transformer such as IPT on FIG. 20 but here the circuit is adapted for three-phase operation. It is observed that in each set of these positive or negative banks, the two associated forced commutating circuits are alternately fired but for both positive and negative banks simultaneously. Thus, the non-prime type of forced commutating circuit for the positive and negative sides are fired together and the prime type of forced commutating circuit for the positive and negative sides are fired together, the second alternately with the first.

Figure 29:
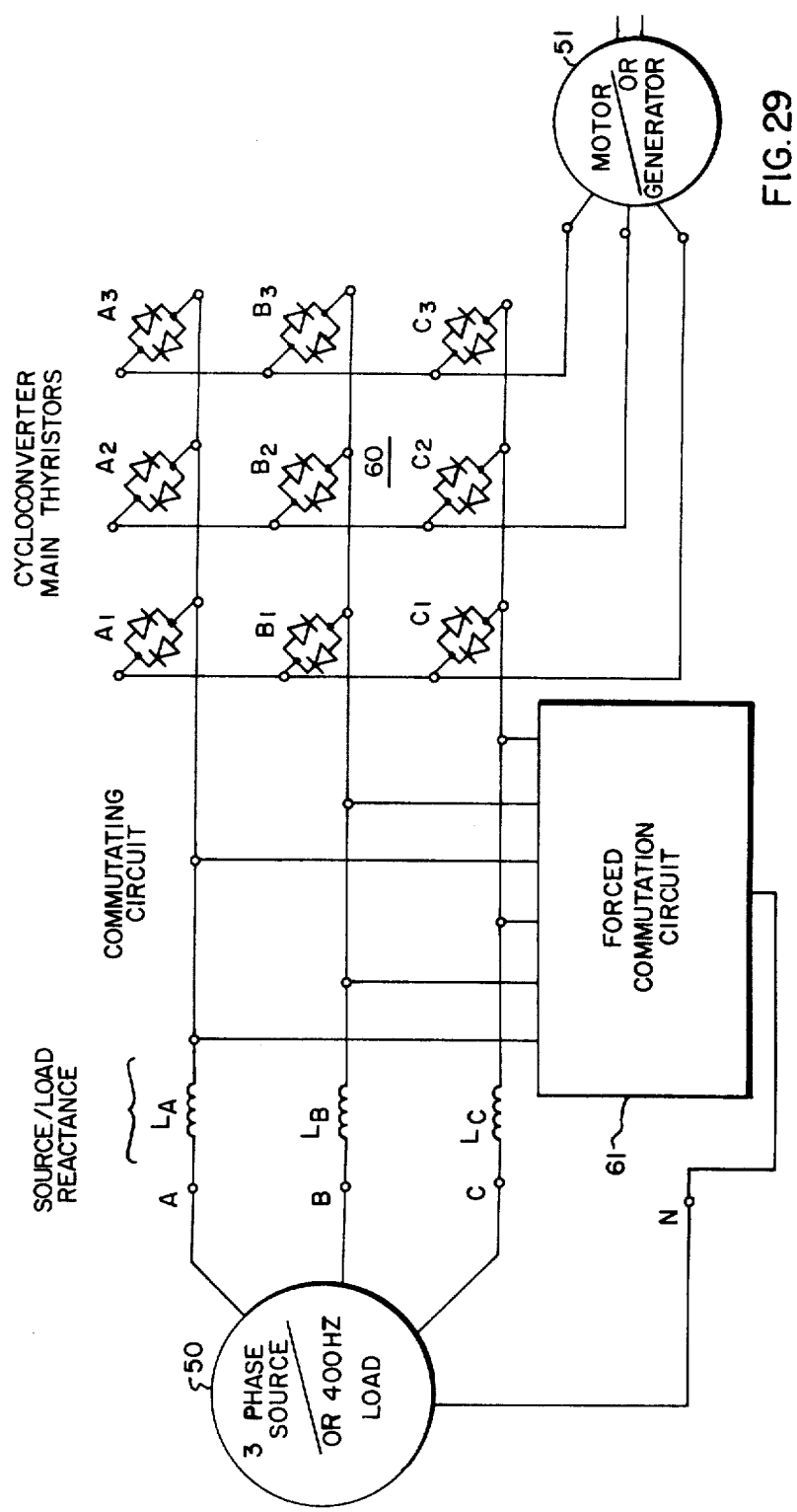
FIG. 29 shows a dual power flow electrical system embodying the present invention.

FIG. 29 shows a dual power flow electrical system including an improved cycloconverter embodying the teachings of the present invention. Two three-phase terminals A, B, C and 1, 2, 3 of a cycloconverter 60 are connected with electrical installations, respectively 50 and 51 which under a selected condition of operation are in the relation of power generator to load. Thus 50 may be a three-phase AC source when 51 is a motor, and 50 may be a load when 51 is an electrical generator. This situtation is encountered in practice with the electrical system of an aircraft. In a first mode, when the aircraft is on the ground, a local source of energy at 60 Hz can be used as the source 50 to be converted to a frequency from 0 up to 800 Hz inorder to start the engine when coupled to a motor as the load 51. In such mode, the cycloconverter is operated in the reverse mode. The forced commutation circuit 61 is connected between the three phases A, B, C and the neutral N. As it appears force commutation is with this first mode of the input line type. In the second mode, the source 51 is the alternator on board of the aircraft powered by the engine. The load is now the electrical installation on board of the aircraft which is connected on the output side A, B, C as the load 50, after conversion to a constant frequency of 400 Hz from a variable alternator frequency around 1200 Hz, for instance. Here, the forced commutation circuit according to the present invention is of the load commutation type. The cycloconverter 60 is represented with the main thyristor $A_1$, $A_2$, $A_3$, $B_1$, $B_2$, $B_3$ and $C_1$, $C_2$, $C_3$. The configuration of the commutation circuit 61 could be the one shown in FIG. 24.

From basic considerations of the different approaches for applying forced commutation it was determined that the most practical approach would use commutating circuits common to several thyristors, and connected to the load side of the cycloconverter.

The force commutated cycloconverter has some very desirable characteristics for application in variable speed AC motor drives, and certain other applications.

In general it has been concluded that most known approaches for force commutating cycloconverters have severe operating restrictions rendering their use unsuitable for practical applications. The new approach of using a "DC chopper" appears to be more economical. It is simple in operation and can be used most effectively with balanced three phase "Unrestricted Frequency Changer" (U.F.C.) type cycloconverters, where considerable simplification can be achieved. The "chopper" approach requires as few as two fast turn-off thyristors (and twelve slower ones) to accomplish forced commutation of a three phase, six pulse U.F.C. type cycloconverter; it is capable of relatively high frequency operation, and it generally offers practical and economical solutions for the forced commutation of static frequency changes.

I claim:

1. An AC to AC static frequency changer apparatus for developing an AC output voltage across a load, comprising in combination, an AC polyphase input power source, a plurality of unilateral main switches cyclically and temporarily controlled for conduction under associated phases of said input power source; a DC voltage source, DC chopper means coupled between said DC voltage source and said plurality of main switches, said DC chopper means including cyclically controlled unilateral auxiliary switching means for applying a reverse voltage represented by the difference between said DC voltage and the line to neutral input voltage to said main switches, said reverse voltage being larger than the incoming line voltage for any conducting one of said main switches and with said auxiliary switching means being controlled for conduction at an instant subsequent to conduction of one of said main switches to apply said reverse voltage thereto and to establish a temporary path for the load current in derivation to said conductive one of said main switches, thereby to commutate conduction from said one main switch to the next main switch being controlled for conduction.

2. An AC to AC static frequency changer apparatus according to claim 1 wherein said chopper means includes means for naturally switching off said auxiliary switching means in relation to said one main switch being commutated and said next main switch being controlled for conduction.

3. An AC to AC static frequency changer apparatus according to claim 2 wherein said off-switching means includes capacitor means responsive to said load current for charging and to said auxiliary switching means for discharging.

4. An AC to AC static frequency changer apparatus according to claim 3 wherein said off-switching means includes inductive means resonantly coupled to said capacitors for self-commutating said auxiliary switching means.

5. An AC to AC static frequency changer apparatus according to claim 4 wherein said auxiliary switching means is unilateral and said off-switching means includes means responsive to said inductance means for applying a reverse voltage to said auxiliary switching means.

6. An AC to AC static frequency changer apparatus according to claim 1 wherein said means for applying a reverse voltage to said auxiliary working means includes first diode means connected in antiparallel thereto.

7. An AC to AC static frequency changer apparatus according to claim 6 wherein said DC voltage source is connected in parallel to said main switching and in series with one of said load and AC power source.

8. An AC to AC static frequency changer apparatus according to claim 7 wherein second diode means is provided in series with said auxiliary switching means having a direction opposing current flow from said main switch.

9. An AC to AC static frequency changer apparatus according to claim 8 wherein said DC voltage source includes first and second DC means of opposite polarity connected in voltage aiding relation with respect to said capacitor means, said inductance means and said capacitor means having one end at a junction point, third diode means being provided between said second DC means and said junction point, the other end of said capacitor means being connected to one end of said first DC means and of said second diode means, the other end of said inductance means being connected to the other end of said auxiliary switching means and of said second diode means.

10. An AC to AC static frequency changer apparatus according to claim 9 wherein said capacitor means is recharged to a limit defined by said second DC means.

11. An AC to AC static frequency changer apparatus according to claim 10 wherein said temporary path includes said first DC means and said second diode means.

12. An AC to AC static frequency changer apparatus according to claim 11 wherein the resonant combination of said capacitor means and said inductance means rings back via said first diode means.

13. An AC to AC static frequency changer apparatus according to claim 9 wherein said unilateral main switches are associated in pairs for each phase of said AC input power source, a first main switch of such pair being oriented to pass current in the direction of said load and a second main switch of such pair being oriented to pass current in a direction from said load, wherein said auxiliary switching means and said second diode means are applied to at least the plurality of one of said first and second main switches.

14. An AC to AC static frequency changer apparatus according to claim 9 wherein two groups of said main switches are provided one positive said group being in a positive bank and one negative said group being in a negative bank, at least two of said DC chopper means being associated respectively with said two groups of main switches, and wherein said first and second DC means are connected in circuit with the respective positive and negative banks to serve as said first DC means in one bank and as said second DC means in the other bank.

15. An AC to AC static frequency changer apparatus according to claim 9 wherein said chopper means and DC voltage source are connected between one end of said load and a neutral connection common to said polyphase AC power source and the other end of said load.

16. An AC to AC static frequency changer apparatus according to claim 14 wherein four chopper means are provided each associated with one plurality of said main switches of one type, said DC voltage source being common to said four chopper means.

17. An AC to AC static frequency changer apparatus according to claim 16 wherein said third diode means is interposed in each of said four chopper means and is connected to said common DC voltage source.

18. An AC to AC static frequency changer apparatus according to claim 16 wherein said first and second DC means within said common DC voltage source are serving as said first DC means in one bank and said second means in the other bank.

19. An AC to AC static frequency changer apparatus according to claim 9 wherein said neutral line is connected between said polyphase power source and the junction point between said first and second DC means.

20. An AC to AC static frequency changer apparatus according to claim 9 wherein said power source includes two three phase inputs, and corresponding main switches being connected in wye via an interphase transformer having a central tap, said load being connected from said central tap to the junction of said first and second DC means in a common DC voltage source and to the neutral line of said AC power source; and wherein four said chopper means are provided between said common DC voltage source and the respective ends of said reactor.

21. An AC to AC static frequency changer apparatus according to claim 20 wherein two said chopper means are provided between said common DC voltage source and the respective ends of said transformers.

22. An AC to AC static frequency changer apparatus according to claim 9 wherein said frequency changer apparatus has three output phases each having a positive and a negative bank, at least two said chopper means being associated with the main switches of the respective banks in accordance with the polarity thereof.

23. An AC to AC static frequency changer apparatus according to claim 22, wherein said first and second DC are associated respectively with said two chopper means in reciprocal fashion with respect to one and the other of said two chopper means.

24. An AC to AC static frequency changer apparatus according to claim 23 wherein said two chopper means are operated simultaneously on all of said main switches for all phases.

25. An AC to AC static frequency changer apparatus according to claim 22 wherein four chopper means are provided selectively controlled to commutate selected phases of said main switches.

26. An AC to AC static frequency changer apparatus according to claim 25 wherein said first diode means are replaced by controlled unidirectional switches selectively controlled in accordance with the selected phases of said main switches.

27. An AC to AC static frequency changer apparatus according to claim 9 wherein means is provided for sensing the polarity of the load current through zero crossing and wherein said unilateral auxiliary switching means is responsive to said sensing means.

28. An AC to AC static frequency changer apparatus having first and second terminals for developing a polyphase AC output voltage of a predetermined frequency at one of said first and second terminals from a polyphase AC input voltage of a given frequency applied at the other of said first and second terminals for power flow therebetween comprising a plurality of unilateral main switching means cyclically and temporarily controlled for conduction, said main switching means being associated in pairs with the respective phases of the input terminals, and a DC voltage source, DC chopper means coupled between said DC voltage source and said plurality of main switches, said DC chopper means including cyclically controlled unilateral auxiliary switching means for applying a reverse voltage represented by the difference between said DC voltage and the line to neutral input voltage to said main switches, said reverse voltage being larger than the incoming line voltage for any conducting one of said main switches and with said auxiliary switching means being controlled for conduction at an instant subsequent to conduction of one of said main switches to apply said reverse voltage thereto and to establish a temporary path for the load current in derivation to said conductive one of said main switches, thereby to commutate conduction from said one main switch to the next main switch being controlled for conduction.

* * * * *